(12) United States Patent
Kimura et al.

(10) Patent No.: US 7,327,237 B2
(45) Date of Patent: Feb. 5, 2008

(54) INFORMATION PROVIDING APPARATUS FOR A VEHICLE

(75) Inventors: Takeshi Kimura, Yokohama (JP); Tatsuya Suzuki, Yokosuka (JP); Naotaka Usui, Yokosuka (JP); Genpei Naito, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 40 days.

(21) Appl. No.: 10/693,984

(22) Filed: Oct. 28, 2003

(65) Prior Publication Data
US 2004/0090319 A1 May 13, 2004

(30) Foreign Application Priority Data
Nov. 12, 2002 (JP) ............... 2002-328175

(51) Int. Cl.
*B60Q 1/00* (2006.01)
*B60T 8/14* (2006.01)
*G06F 7/00* (2006.01)

(52) U.S. Cl. ............ 340/436; 340/438; 340/439; 340/441; 701/95; 701/96

(58) Field of Classification Search ......... 340/436, 340/438, 439, 441; 701/93, 95, 96
See application file for complete search history.

(56) References Cited

U.S. PATENT DOCUMENTS 6,289,281 B1 * 9/2001 Shinmura et al. ........... 701/301
6,604,042 B2 * 8/2003 Maruko et al. ............... 701/96
6,624,747 B1 * 9/2003 Friederich et al. .......... 340/436
2003/0014176 A1 * 1/2003 Levine ....................... 701/70

FOREIGN PATENT DOCUMENTS

| JP | 5-24518 A | 2/1993 |
| JP | 5-24519 A | 2/1993 |
| JP | 9-286313 A | 11/1997 |

* cited by examiner

*Primary Examiner*—Julie Bichngoc Lieu
(74) *Attorney, Agent, or Firm*—Foley & Lardner LLP

(57) ABSTRACT

A warning apparatus for a vehicle determines a contact possibility of the vehicle contacting with an object that is present in front of the vehicle according to a relative distance between the vehicle and the front object, a relative speed between the vehicle and the front object, and the like, and provides a contact possibility warning by changing at least one of the driving torque and braking torque of the vehicle according to the contact possibility. The warning apparatus detects, an intention of the driver of the vehicle to bring the vehicle closer to the front object in a steady driving state of the vehicle by, for example, changing a lane of the vehicle. The warning apparatus calculates a correction value to change the driving torque or braking torque according to a result of the detection, delays the timing of providing the contact possibility warning, and controls braking force.

32 Claims, 25 Drawing Sheets

BRAKE - PEDAL STROKE

LONG DISTANCE TO FRONT VEHICLE

SHORT DISTANCE TO FRONT VEHICLE

FIG. 29

EXPRESSWAY
- 11. ON CRUISING LANE
- 12. ENTRANCE LANE
- 13. EXIT LANE
- 14. ENTRANCE LANE FOR SERVICE AREA
- 15. EXIT LANE FROM SERVICE AREA
- 16. NEAR TOLLGATE

OTHER TOLL ROADS (INCLUDING BYPASSES)
- 21. ON CRUISING LANE
- 22. ENTRANCE LANE
- 23. EXIT LANE
- 24. ENTRANCE LANE FOR SERVICE AREA
- 25. EXIT LANE FROM SERVICE AREA
- 26. NEAR TOLLGATE

FIRST-CLASS NATIONAL ROAD
- 31. ON CRUISING LANE
- 32. NEAR SEPARATION OR INTERSECTION

OTHER OPEN ROADS
- 41. ON CRUISING LANE
- 42. NEAR SEPARATION OR INTERSECTION

INFORMATION PROVIDING APPARATUS FOR A VEHICLE

CROSS REFERENCE TO RELATED APPLICATION

This application claims benefit of priority under 35USC §119 to Japanese Patent Applications No. 2002-328175, filed on Nov. 12, 2002, the entire contents of which are incorporated by reference herein.

BACKGROUND OF THE INVENTION

1. Field of the Invention

The present invention relates to a warning apparatus for a vehicle, to provide a contact possibility warning by conducting deceleration control according to the possibility of the vehicle contacting an object that is present in front of the vehicle.

2. Description of the Related Art

A technique of providing the driver of a vehicle with a contact possibility warning to prevent the vehicle from colliding with a front object (e.g., a vehicle running in front of the vehicle in question) is disclosed in, for example, Japanese Unexamined Patent Application Publication No. 9-286313. The technique of proving a contact possibility warning like this disclosure detects a front object with a laser radar or a radio radar and warns of a possibility of contacting the detected object by sending an alarm sound or by conducting deceleration control. Such warning operations as emitting an alarm sound and conducting deceleration control reduce or prevent a chance of the vehicle hitting the front object.

SUMMARY OF THE INVENTION

In an actual traffic environment, a vehicle may get closer to a front object due to an intentional operation of the driver of the vehicle with the driver being ready for quick deceleration to avoid contacting with the front object. This may be the case when the front object, which may be a vehicle running in front of the vehicle in question, is obliquely in front of the vehicle and the driver of the vehicle intentionally changes its lane in order to drive behind the front vehicle. In this case, it is preferable to suppress an unnecessary warning operation and reduce annoyance on the driver.

There is a possibility, however, that the front vehicle is decelerating and the driver of the vehicle is unaware of the front vehicle's deceleration. Then, a possibility of the vehicle hitting the front vehicle is high, and therefore, a warning must surely be provided. Regardless of such various situations occurring in an actual traffic environment, the related art provides a warning at predetermined timing, and therefore, its deceleration control is frequently excessive or insufficient.

To cope with such circumstances, the present invention provides a warning apparatus for a vehicle capable of effectively providing a contact possibility warning according to an actual situation.

An aspect of the present invention provides a warning apparatus for a vehicle, having a contact possibility warning unit configured to determine a contact possibility of the vehicle contacting with an object that is present in front of the vehicle according to a distance between the vehicle and the front object and provide a contact possibility warning by changing at least one of the driving force and braking force of the vehicle according to the contact possibility, a driver intention detector configured to detect an intention of the vehicle's driver of intentionally reducing the distance to the front object under a steady driving condition, and a warning controller configured to delay, if the driver intention detector detects that the driver is intentionally reducing the distance to the front object under a steady driving condition, the operation timing of the contact possibility warning unit based on the distance to the front object.

For example, when changing the current lane of the vehicle to the next lane where the front vehicle is ruining, the driver must be ready for quick deceleration to avoid the vehicle from hitting the front vehicle. In this case, the present invention delays the warning timing.

The "warning" in this specification means to give the driver of a vehicle direct perception of a change (correction) in driving force or braking force instead of converting the warning into, for example, a sound or an image to be heard or seen by the driver or passengers. When controlling driving force or braking force according to a possibility of the vehicle contacting an object, the present invention grasps a driver's intention, corrects a control value of the driving or braking force based on the driver's intention, and provides a contact possibility warning to avoid contacting with the object without annoying the driver with unnecessary warnings.

BRIEF DESCRIPTION OF THE DRAWINGS

FIG. 29 shows a data structure of road classification information;

DESCRIPTION OF THE PREFERRED EMBODIMENT

Various embodiments of the present invention will be explained in detail with reference to the accompanying drawings. In the following explanation, a vehicle to which the present invention is applied or in which the waning apparatus of the present invention is installed is sometimes referred to as the "own vehicle," and the running speed of the own vehicle is sometimes referred to as the "own vehicle speed."

First Embodiment

Figure 1:
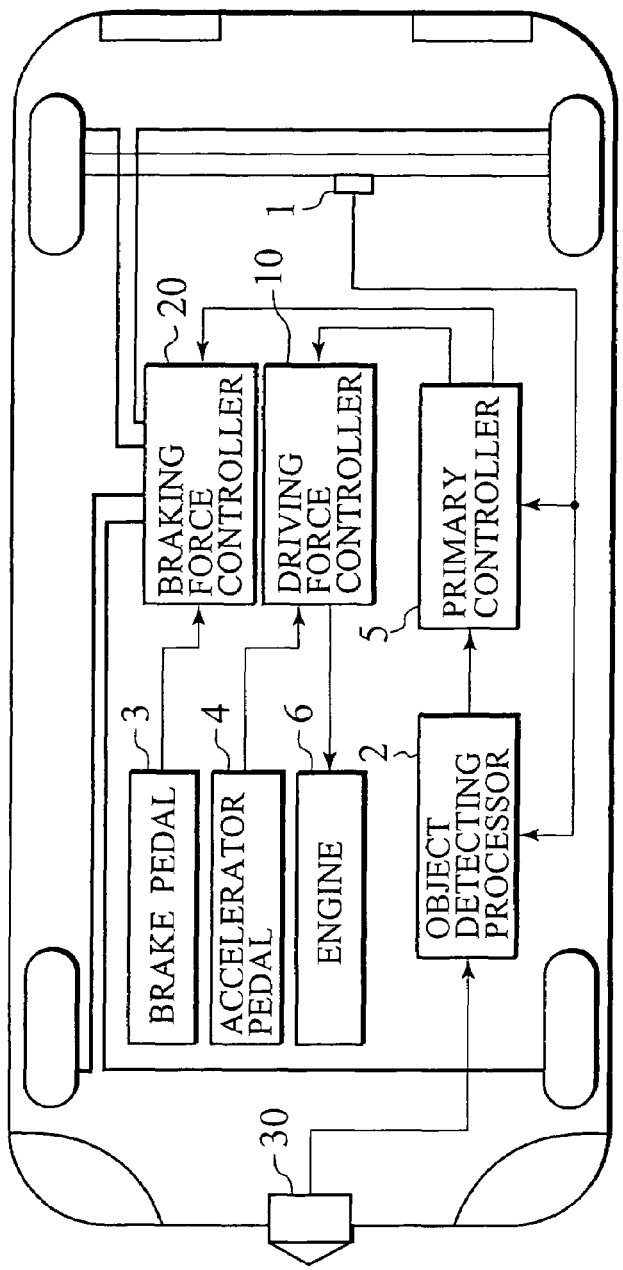
FIG. 1 shows a drive control system of a vehicle employing a warning apparatus according to a first embodiment of the present invention.

FIG. 1 shows a drive control system of a vehicle employing a warning apparatus according to the first embodiment of the present invention.

The drive control system includes a radar 30, a vehicle speed sensor 1, an object detecting processor 2, a brake pedal 3, an accelerator pedal 4, a braking force controller 20, a driving force controller 10, a primary controller 5, and an engine 6. Although not particularly shown, the vehicle naturally includes other components such as a steering angle sensor. The driving force controller 10 controls the engine 6 so that the engine 6 may generate a driving force corresponding to a stroke of the accelerator pedal 4 as an accelerating operator. The driving force controller 10 is also designed to change the driving force in response to an external command.

Figure 2:
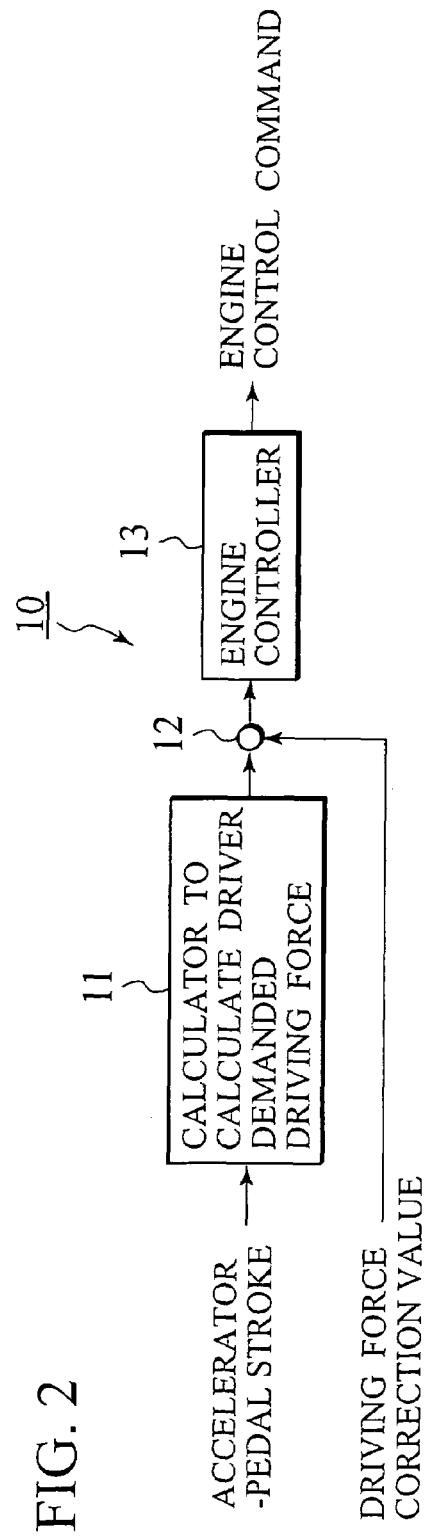
FIG. 2 is a block diagram showing a driving force controller in the drive control system.
Figure 3:
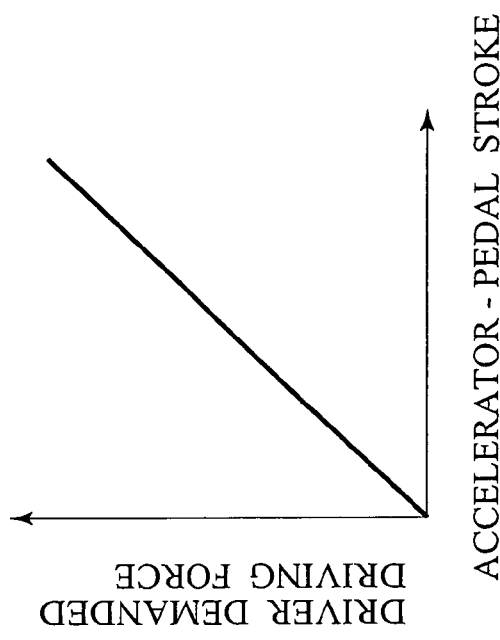
FIG. 3 is a characteristic diagram showing a relationship between accelerator pedal strokes and driver demanded driving force.

FIG. 2 is a block diagram showing the driving force controller 10. The driving force controller 10 includes a calculator 11 to calculate a driving force demanded by the driver of the vehicle, an adder 12, and an engine controller 13. The calculator 11 calculates a driving force demanded by the driver (hereinafter referred to as the driver demanded driving force) according to a stroke of the accelerator pedal 4 (hereinafter referred to as the accelerator-pedal stroke). The calculator 11 employs a characteristic diagram (hereinafter referred to as the driver demanded driving force calculating map) such as the one shown in FIG. 3 defining a relationship between accelerator-pedal strokes and driver demanded driving force, to find a driver demanded driving force corresponding to a given accelerator-pedal stroke. The calculator 11 provides the found driver demanded driving force to the engine controller 13 through the adder 12. The driver demanded driving force calculating map is stored in the calculator 11. The engine controller 13 provides a control command to the engine 6 according to the driver demanded driving force as a target driving force. Based on the control command, the engine 6 is driven. In the driving force controller 10, the adder 12 receives a driving force correction value. Upon receiving the driving force correction value, the adder 12 adds the correction value to a driver demanded driving force and provides a target driving force, i.e., a corrected driver demanded driving force. In this way, in the driving force controller 10, the calculator 11 calculates a driver demanded driving force according to an accelerator-pedal stroke, and if there is an input driving force correction value, the adder 12 adds the correction value to the driver demanded driving force and provides the sum as a target driving force. Then, the engine controller 13 provides a control command corresponding to the target driving force.

Figure 4:
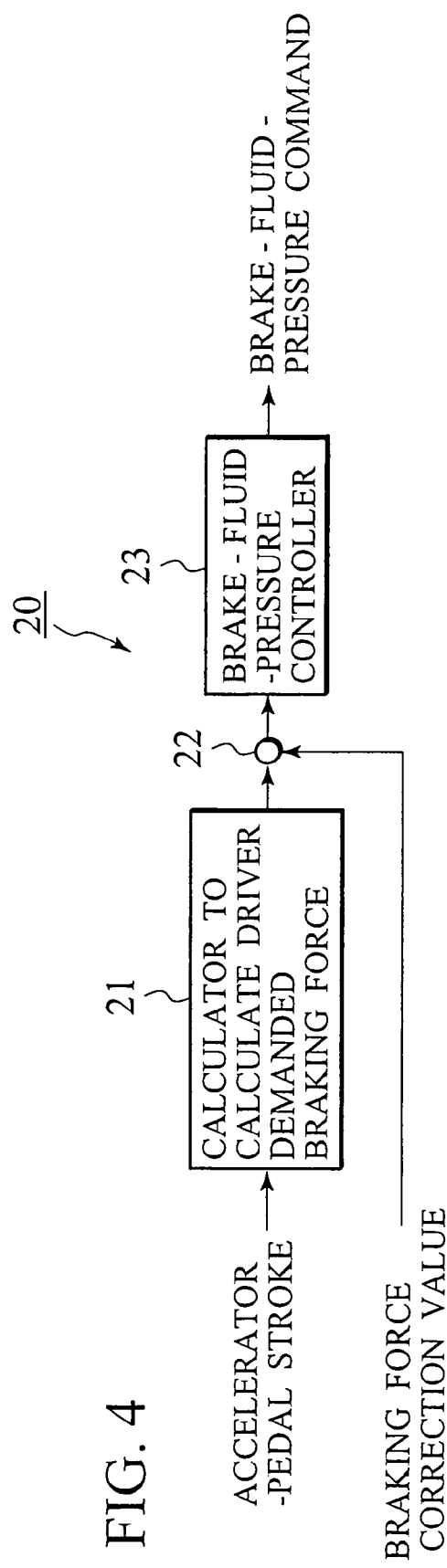
FIG. 4 is a block diagram showing a braking force controller in the drive control system.

The braking force controller 20 of the present embodiment controls brake fluid pressure to generate a braking force corresponding to a stroke of the brake pedal 3 as a braking operator. The braking force controller 20 is also designed to change the braking force according to an external command. FIG. 4 is a block diagram showing the braking force controller 20. The braking force controller 20 includes a calculator 21 to calculate a braking force demanded by the driver, an adder 22, and a brake fluid pressure controller 23.

Figure 5:
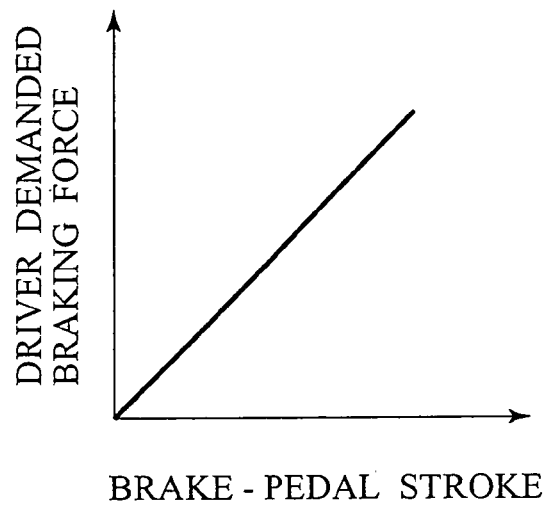
FIG. 5 is a characteristic diagram showing a relationship between brake pedal strokes and driver demanded braking force.

The calculator 21 calculates a braking force demanded by the driver (hereinafter referred to as the driver demanded braking force) according to a stroke of the brake pedal 3 (hereinafter referred to as the brake-pedal stroke). The calculator 21 employs a characteristic diagram (hereinafter referred to as the driver demanded braking force calculating map) such as one shown in FIG. 5 defining a relationship between brake-pedal strokes and driver demanded braking force, to find a driver demanded braking force corresponding to a given brake-pedal stroke. The calculator 21 provides the found driver demanded braking force to the brake fluid controller 23 through the adder 22. The driver demanded braking force calculating map is stored in the calculator 21.

The brake fluid pressure controller 23 provides a brake fluid pressure command according to a given driver demanded braking force as a target braking force. In the braking force controller 20, the adder 22 receives a braking force correction value. Upon receiving the braking force correction value, the adder 22 adds the correction value to a driver demanded braking force and provides the corrected driver demanded braking force as a target braking force.

In this way, in the braking force controller 20, the calculator 21 calculates a driver demanded braking force according to a brake-pedal stroke, and if a braking force correction value is inputted, the adder 22 adds the correction value to the driver demanded braking force and provides the sum as a target braking force. According to the target braking force, the brake fluid pressure controller 23 provides a brake fluid pressure command.

Figure 6:
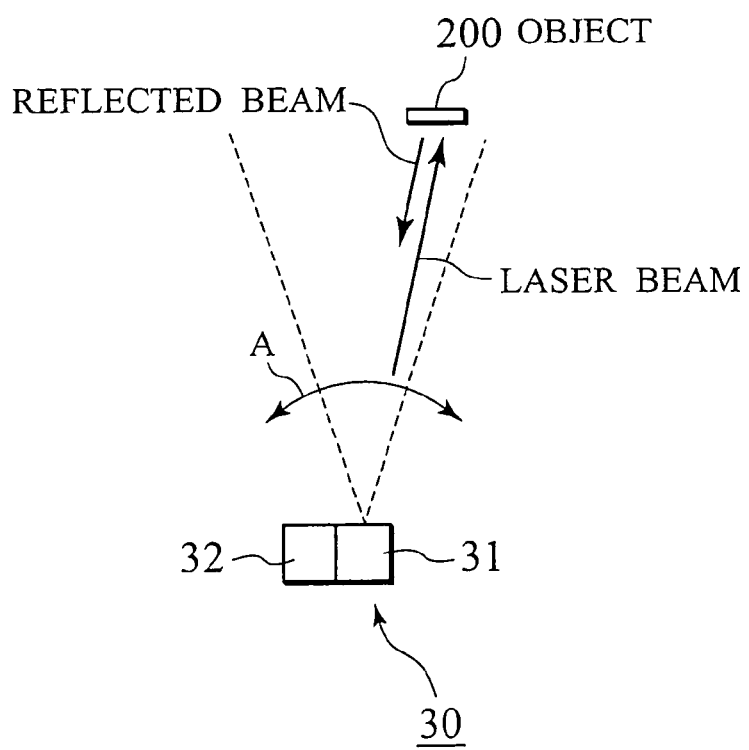
FIG. 6 shows a radar in the drive control system.

The radar 30 of the present embodiment is installed at a front part of the vehicle as shown in FIG. 1, to calculate a distance to a front object. FIG. 6 shows an exemplary structure of the radar 30. The radar 30 includes an emitter 31 to emit an infrared laser beam and a photosensor 32 to receive a reflection of the laser beam and provide a voltage representative of the received reflection. The emitter 31 and photosensor 32 are arranged adjacent to each other. The emitter 31 is combined with a scanning mechanism to swing the emitter 31 in the directions indicated with an arrow mark A in FIG. 6. The emitter 31 emits a laser beam by sequentially changing the angle thereof within a predetermined angular range. The radar 30 measures a distance between the vehicle and a front object 200 according to a time difference between the emission of the laser beam from the emitter 31 and the reception of a reflected beam by the photosensor 32.

As mentioned above, the scanning mechanism swings the emitter 31 and the radar 30 determines whether a reflected beam has been received at each scan position or scan angle, and upon receiving a reflected beam, calculates a distance to the front object 200. According to the distance to the front object 200 and a scan angle at the detection of the front object 200, the radar 30 also calculates a left-right position of the front object 200 relative to the vehicle. Namely, the radar 30 is configured to determine a relative position of the object 200 with respect to the vehicle.

Figure 7:
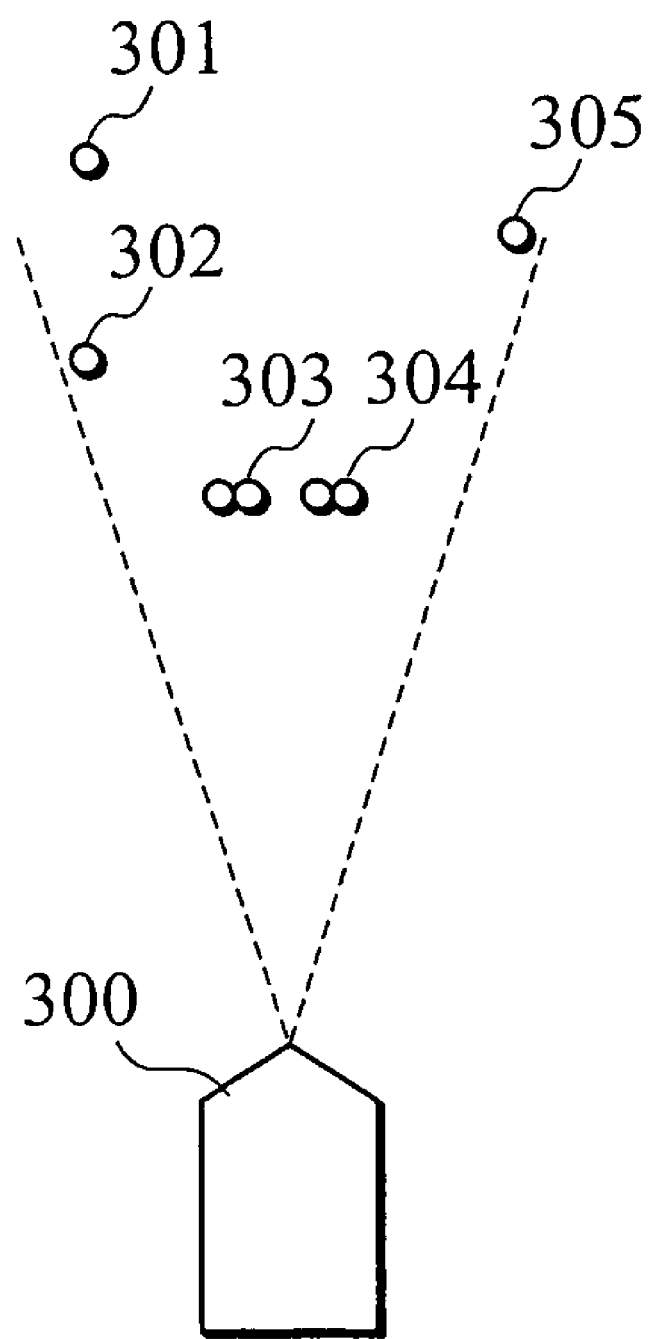
FIG. 7 shows objects detected by scanning with the radar.

FIG. 7 shows examples of objects detected by the scanning operation of the radar 30 installed at a front part of the vehicle 300. At each scan angle, the radar 30 determines a relative position of each object relative to the vehicle and provides a plan view of objects detected within a scanning range as shown in FIG. 7. The radar 30 is not limited to the one employing the optical emitter 31 that emits infrared beans. The emitter 31 may be of a radio type that emits microwaves or millimeter waves. Instead, the radar 30 may be an apparatus that processes video images to detect the front object 200. The radar 30 provides the detected result to the object detecting processor 2.

The object detecting processor 2 is configured to obtain information about the front object 200 according to the detected result provided by the radar 30. More precisely, the object detecting processor 2 compares object presence states provided by the radar 30 at scanning intervals (scan angles) with each other and determines the motion of each object. At the same time, the object detecting processor 2 determines whether the detected objects represent an identical object or different objects according to information concerning the proximity and similarity of the detected objects.

Through these processes, the object detecting processor 2 provides a distance X (m) to a detected front object in a front-rear direction, a distance Y (m) to the front object in a left-right direction, a width W (m) of the front object, and a relative speed $\Delta V$ (m/s) between the running speed of the vehicle and the moving (running) speed of the object. If the object detecting processor 2 detects a plurality of objects, it provides such pieces of information for each of the detected objects. The processor 2 regularly provides such information to the primary controller 5. The primary controller 5 is configured to conduct various control operations for the vehicle. The following explanation is made only on functions of the primary controller 5 concerning the present invention. The primary controller 5 receives vehicle speed information from the vehicle speed sensor 1, detection results from the object detecting processor 2, accelerator-pedal stroke information from the accelerator pedal 4, and the like. According to these pieces of information, the primary controller 5 generates command signals and supplies the command signals to the driving force controller 10 and braking force controller 20, respectively.

Figure 8:
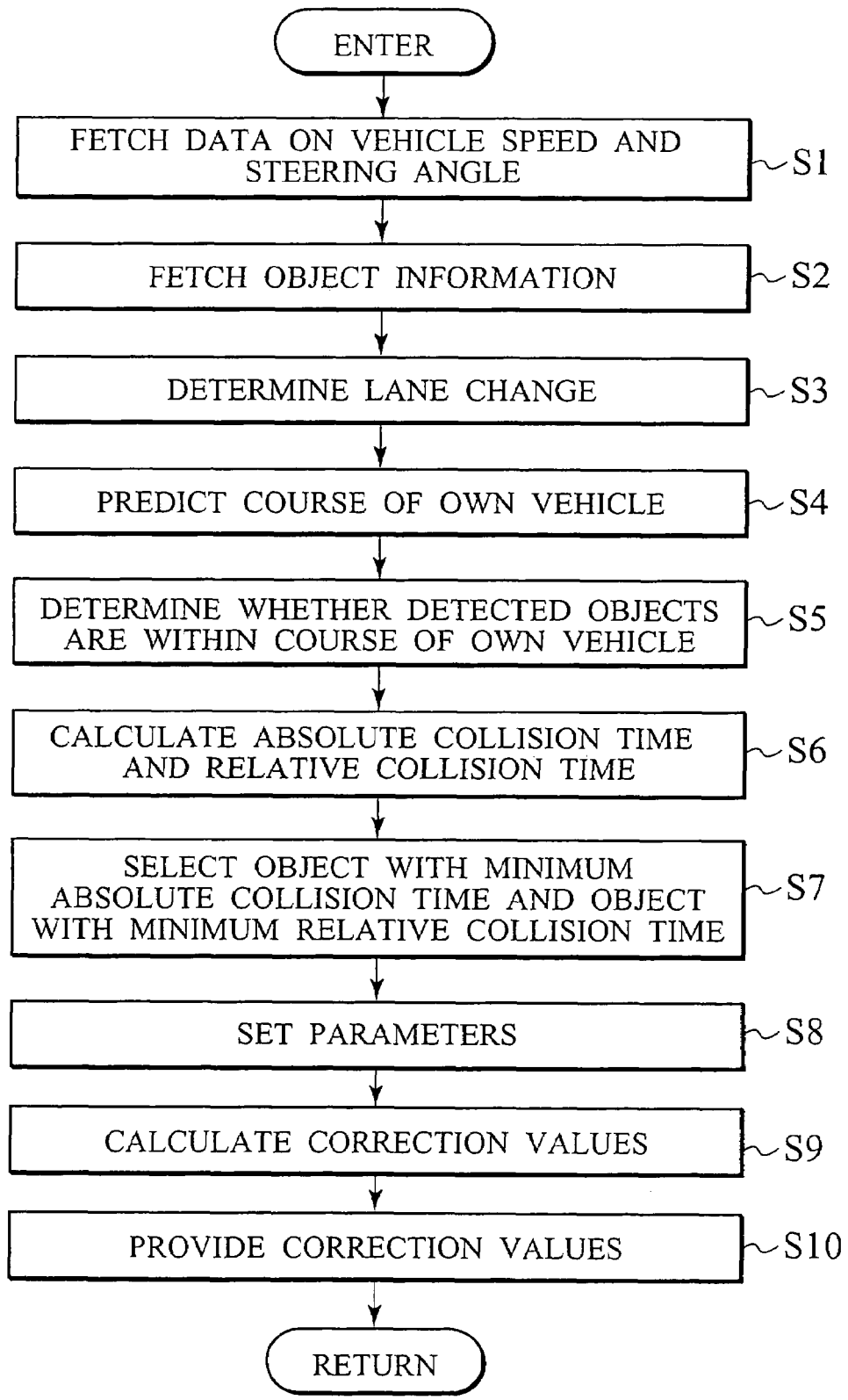
FIG. 8 is a flowchart showing steps carried out by a primary controller in the drive control system.

Processes carried out by the primary controller 5 will be explained with reference to FIG. 8. The primary controller 5 executes the steps of FIG. 8 as subroutines that are regularly called in response to timer interrupts. In step S1, the primary controller 5 fetches vehicle speed data and steering angle data from the vehicle speed sensor 1 and steering angle sensor (not shown), respectively. The vehicle speed sensor 1 and steering angle sensor are each an encoder that provides pulses at predetermined intervals in response to the rotation thereof. The primary controller 5 counts the number of pulses from each of the sensors and accumulates the counts to provide a steering angle $\delta$ (rad) and a vehicle speed Vh (m/s). These results are stored in a memory (not shown) of the primary controller 5.

In step S2, the primary controller 5 fetches object information concerning the relative motion of an object. This information includes, for example, a relative positional relationship (such as a relative distance and a relative direction), a relative speed, a relative acceleration, and the like between the vehicle and the object.

The object information fetched by the primary controller 5 from the object detecting processor 2 typically includes a front-rear direction X (m), a left-right direction Y (m), an object width W (m), and a relative speed $\Delta V$ (m/s). The primary controller 5 employs a standard communication technique such as a serial communication technique to communicate with the object detecting processor 2. The primary controller 5 stores the fetched information in the memory thereof.

Figure 9:
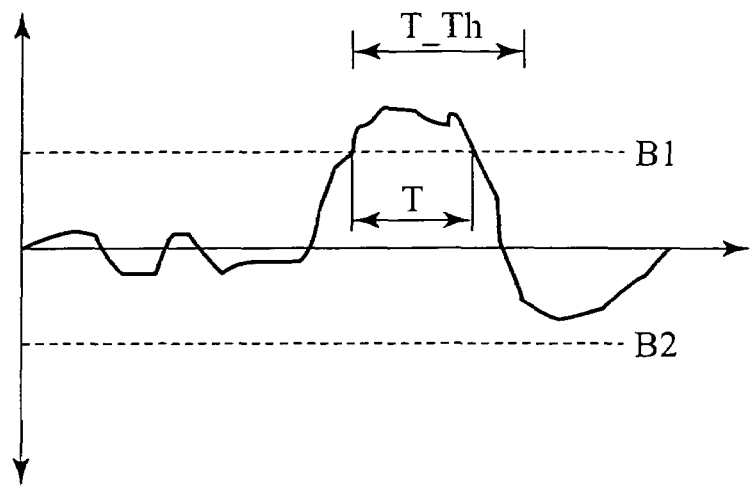
FIG. 9 explains a lane change determining process in the flowchart of FIG. 8.

In step S3, the primary controller 5 conducts a lane change determining process. FIG. 9 shows temporal changes in steering speed corresponding to steering angle changing speed. In FIG. 9, the lane change determination is carried out by comparing a steering speed with thresholds B1 (in clockwise direction) and B2 (in counterclockwise direction). More precisely, if the steering speed (absolute value) is greater than the threshold B1 or B2 and if a duration T during which the steering speed is above the threshold reaches a predetermined value T_Th, it is determined that the vehicle has changed its lane. The lane change determination may be made through another technique, for example, by detecting the operating state of a winker. When the winker is employed to conduct the lane change determination, a lane change will be determined if the winker is switched to the right or left for a predetermined time. Next, in step S4, the primary controller 5 carries out a course prediction process according to the fetched vehicle speed Vh and steering angle $\delta$. A tuning curvature $\rho$ (1/m) is expressed with the vehicle speed Vh and steering angle $\delta$ as in the following expression (1):

$$\rho = 1/\{(1+A \cdot Vh^2)L\} \cdot (\delta/N) \tag{1}$$

where L is a wheel base of the vehicle, A is a stability factor which is a positive constant to be determined according to the vehicle, and N is a steering gear ratio.

A turning radius R is expressed with the use of the turning curvature ρ as follows:

$$R=1/\rho \quad (2)$$

Figure 10:
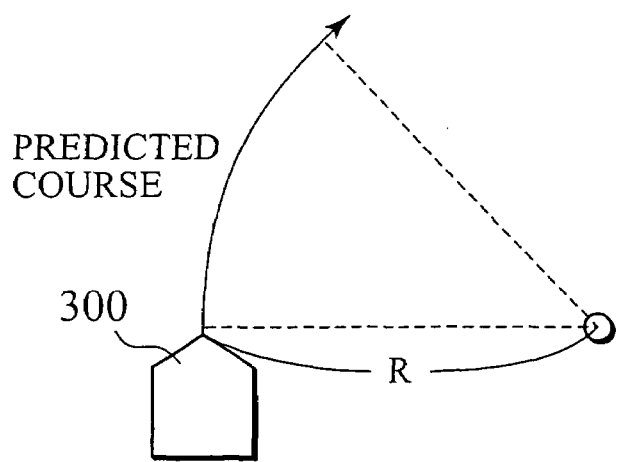
FIG. 10 explains a course prediction carried out by the drive control system.

The turning radius R can be used as shown in FIG. 10 to predict a course of the vehicle as a circular arc having the radius R centered at a point perpendicularly (rightward in FIG. 10) distanced from the vehicle 300 by the radius R.

In the following explanation, the steering angle δ takes a positive value for rightward steering and a negative value for leftward steering. In connection with the turning curvature and turning radius, it is defined that a positive steering angle δ corresponds to a right turn and a negative steering angle δ corresponds to a left turn.

Figure 11:
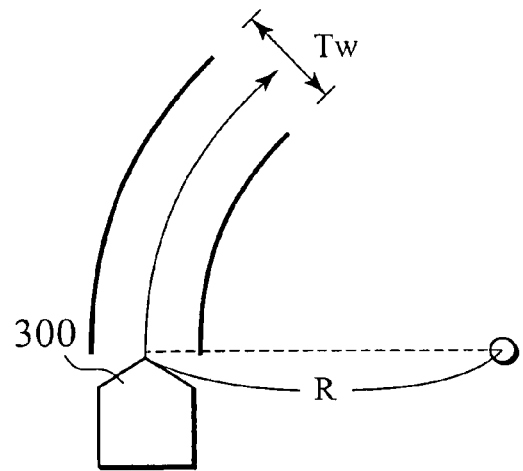
FIG. 11 explains a course prediction conducted in consideration of the width of a vehicle.

Thereafter, the predicted course is converted into one having a vehicle width or a lane width. The predicted course is only a locus predicting a course of the vehicle, and therefore, it is necessary to determine a vehicle driving zone having the vehicle width or lane width. FIG. 11 shows a predicted course zone obtained by considering the vehicle width or lane width. The predicted course zone shown in FIG. 11 is obtained by adding the width Tw of the vehicle 300 to the predicted course. The predicted course zone of the vehicle is defined by a circular arc with a radius of "R−Tw/2" and a circular arc with a radius of "R+Tw/2" depicted around the same center as that for the predicted course.

Instead of the steering angle δ, a yaw rate γ may be employed with the vehicle speed Vh to express the course of the vehicle as in the following expression (3):

$$R=Vh/\gamma \quad (3)$$

Alternatively, a course of the vehicle may be predicted with the use of a lateral acceleration Yg and the vehicle speed Vh as in the following expression (4):

$$R=Vh^2/Yg \quad (4)$$

The following explanation is based on the course of the vehicle predicted according to the vehicle speed Vh and steering angle δ as mentioned first.

In step S5, the primary controller 5 determines, in step S5, whether the object (obstacle) is in the predicted course according to the information about the object fetched in step S2. If the object is in the predicted course, step S6 and the steps that follow carry out a contact possibility determining process for the object. This process excludes any object that is out of the predicted course zone from consideration of contact possibility even if the object is located very close to the vehicle.

In step S6, the primary controller 5 calculates an absolute collision time THW by dividing the distance X between the vehicle and the object by the vehicle speed Vh according to the following expression (5). The primary controller 5 also calculates a relative collision time TTC by dividing the distance X by the relative speed Vr (or ΔV) according to the following expression (6).

$$THW=X/Vh \quad (5)$$

$$TTC=X/Vr \quad (6)$$

If step S5 determines that there are a plurality of objects in the predicted course zone, the absolute collision time THW and relative collision time TTC are calculated for each of the objects. The absolute collision time THW indicates a time period in which the vehicle collides with the object if the object stops at the moment. The relative collision time indicates a time period in which the vehicle collides with the object if the relative speed Vr is maintained.

In step S7, the primary controller 5 selects an object (obstacle) having a minimum absolute collision time THW and an object (obstacle) having a minimum relative collision time TTC.

Figure 12:
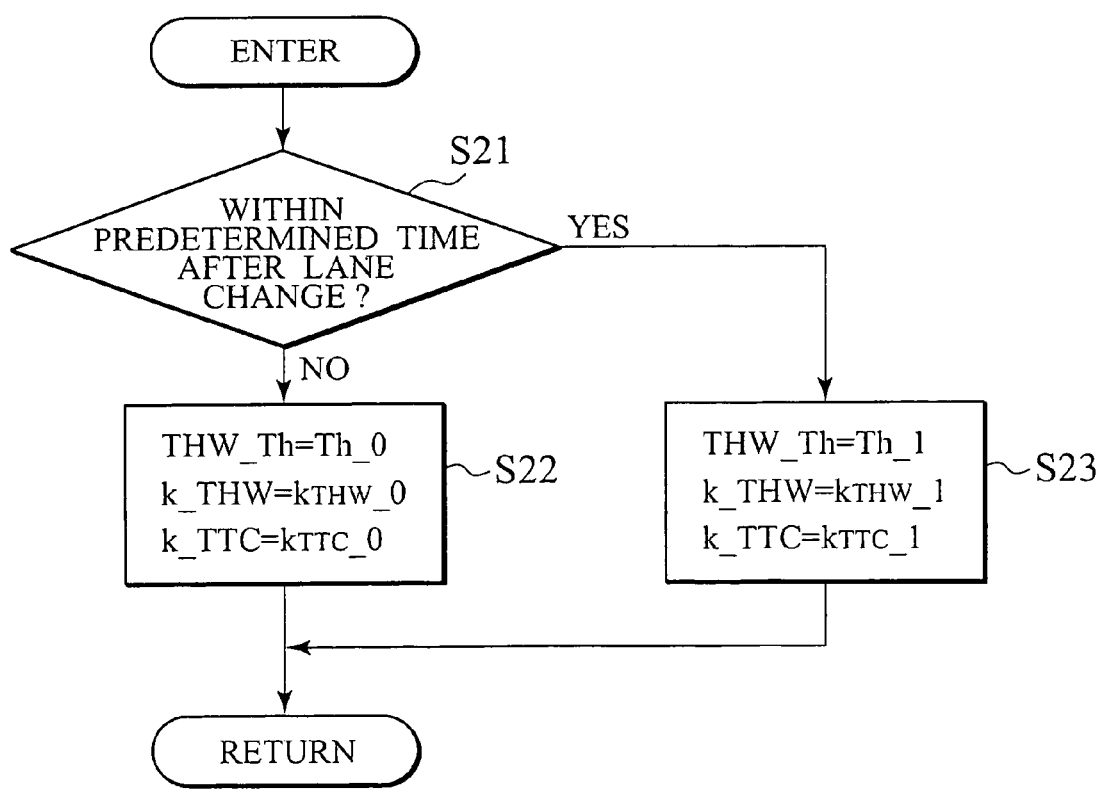
FIG. 12 is a flowchart showing a parameter setting process of the flowchart of FIG. 8.

In step S8, the primary controller 5 carries out a parameter setting process as shown in FIG. 12.

In step S21, the primary controller 5 determines whether an elapsed time after a lane change is within a predetermined time. More precisely, it is determined whether the elapsed time after the timing of the lane change detected by the lane change determining process in step S3 is within the predetermined time. If the elapsed time after the lane change is within the predetermined time, step S23 is carried out, and if it exceeds the predetermined time, step S22 is carried out.

In step S22, the primary controller 5 sets various parameters. The parameters include a threshold (hereinafter referred to as the absolute collision time threshold) THW_Th to be compared with the absolute collision time THW, a control gain (hereinafter referred to as the absolute collision time control gain) k_THW for the absolute collision time THW, and a control gain (hereinafter referred to as the relative collision time control gain) k_TTC for the relative collision time TTC. The details of the absolute collision time threshold THW_Th, absolute collision time control gain k_THW, and relative collision time control gain k_TTC will be explained later.

The parameter setting process of step S22 sets the absolute collision time threshold THW_Th to Th_0 (THW_TH=Th_0), the absolute collision time control gain k_THW to $k_{THW\_}0$ (k_THW=$k_{THW\_}0$), and the relative collision time control gain k_TTC to $k_{TTC\_}0$ (k_TTC=$k_{TTC\_}0$). The value Th_0 is a normal value for the absolute collision time threshold THW_Th, the coefficient $k_{TTC\_}0$ is a normal value for the absolute collision time control gain k_THW, and the coefficient $k_{TTC\_}0$ is a normal value for the relative collision time control gain k_TTC. After setting these values, the primary controller 5 completes the process of FIG. 12.

In step S23, the primary controller 5 sets the absolute collision time threshold THW_Th to Th_1 (THW_=Th_1), the absolute collision time control gain k_THW to $k_{THW\_}1$ (k_THW=$k_{THW\_}1$), and the relative collision time control gain k_TTC to $k_{TTC\_}1$ (k_TTC=$k_{TTC\_}1$). The value Th_1 is smaller than the value Th_0 (Th_1<Th_0), the coefficient $k_{THW\_}1$ is smaller than the coefficient $k_{THW\_}0$ ($k_{THW\_}1<k_{THW\_}0$), and the coefficient $k_{TTC\_}1$ is greater than the coefficient $k_{TTC\_}0$ ($k_{TTC\_}1<k_{TTC\_}0$). After setting these values in step S23, the primary controller 5 completes the process of FIG. 12.

In this way, the primary controller 5 carries out the parameter setting process of step S8. Thereafter, in step S9 of FIG. 8, the primary controller 5 compares the absolute collision time THW of the object having the minimum absolute collision time THW with the absolute collision time threshold THW_Th set in step S8 and calculates a correction value. Also, the primary controller 5 compares the relative collision time TTC of the object having the minimum relative collision time TTC with the threshold TTC_Th (hereinafter referred to as the relative collision time threshold) and calculates a correction value. Although not explained in detail, the relative collision time threshold TTC_Th is set separately similarly as the absolute collision time threshold THW_Th.

Figure 13A:
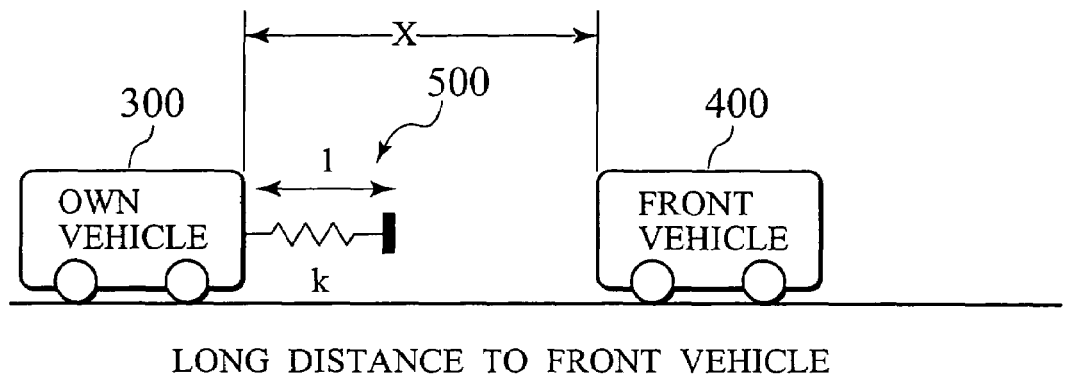
FIG. 13A is a model showing a vehicle with a virtual spring to calculate a correction value, and FIG. 13B showing a model of FIG. 13A in case that the front vehicle is in range of the length of the virtual spring from own vehicle.

Basics on which the correction values are calculated will be explained. As shown in FIG. 13A, a virtual spring as an elastic body 500 having an elastic coefficient k is assumed between the own vehicle 300 and a front vehicle (preceding vehicle) 400 that is an object present in front of the own vehicle 300. In this model, the own vehicle 300 is separated from the front vehicle 400 by a distance X. If this distance X becomes shorter than a distance l, the virtual spring 500 comes in contact with the front vehicle 400 and is compressed. This compression force acts as counter force or repulsive force of the virtual spring 500. This counter force serves as virtual driving resistance against the own vehicle 300. This virtual driving resistance f is expressed as f=k(l−X).

In more detail, the length L_THW (or l) of the virtual spring 500 in the model can be related to the own vehicle speed Vh and the absolute collision time threshold THW_Th and is expressed as follows:

$$L\_THW = THW\_Th \cdot Vh \quad (7)$$

Figure 13B:
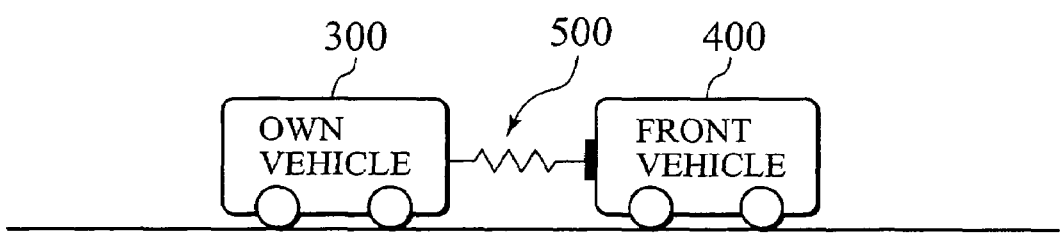

The elastic coefficient or the absolute collision time control gain of the virtual spring 500 of the length L_THW is k_THW (or k) that is assumed to vary in response to the front-rear distance (elastic displacement) X when the front vehicle 400 comes within the range of the length L_THW of the virtual spring 500 from the own vehicle 300 as shown in FIG. 13B. At this time, the vitual spring 500 generates a first counter force F_THW as follows:

$$F\_THW = k\_THW(L\_THW - X) \quad (8)$$

According to this model, the virtual spring 500 having the elastic coefficient k_THW generates the first counter force F_THW when the distance X between the own vehicle 300 and the front vehicle 400 is shorter than the basic length L_THW. The elastic coefficient k_THW is the above-mentioned control gain and is a control parameter to be adjusted to provide a proper warning effect.

As is apparent from the above explanation, the vitual spring 500 will not be compressed in case that a object-to-object distance (a distance between objects) X is greater than the basic length L_THW (X>L_THW). Namely, if X>L_THW, then F_THW is zero. On the other hand, in case that the object-to-object distance X is shorter than L_THW, the first counter force F_THW of the virtual spring 500 serving as a correction value can be calculated from the expression (8) according to the front-rear distance X.

Figure 14:
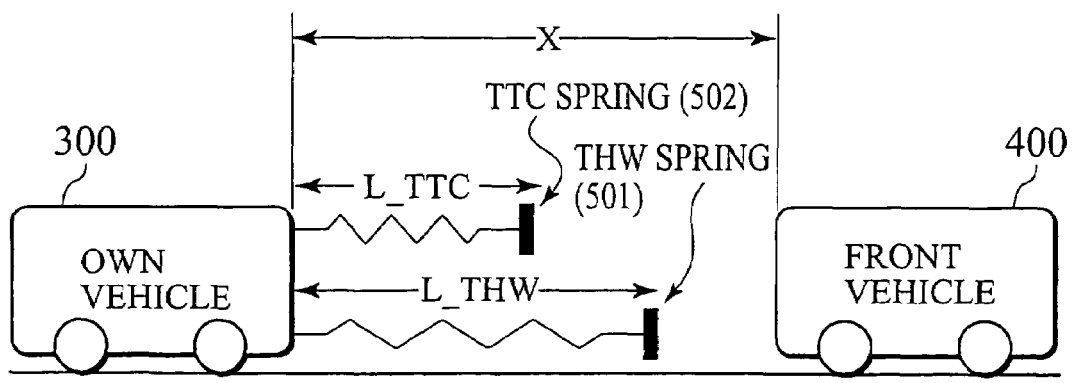
FIG. 14 is a model showing a vehicle with vitual springs representative of absolute collision time and relative collision time.

In the above-mentioned model the length L_THW of the virtual spring (hereinafter referred to as the first virtual spring) 500 is obtained in connection with the own vehicle speed Vh and absolute collision time threshold THW_Th. Also assumed is a model involving a vitual elastic body or spring (hereinafter referred to as the second virtual spring) having a length of L_TTC and related to the relative collision time threshold TTC_Th. FIG. 14 shows the second virtal spring 502 as well as the first vitual spring 501.

In connection with the second virtual spring 502, the length L_TTC thereof can be related to the relative speed Vr and relative collision time threshold TTC_Th as follows:

$$L\_TTC = TTC\_Th \cdot Vr \quad (9)$$

The second virtual spring 502 having the length L_TTC (or l) is assumed to have an elastic coefficient k (the relative collision time control gain k_TTC mentioned above). Like the case shown in FIG. 13B, the length L_TTC changes in response to the front-rear distance (elastic deformation) X when the front vehicle 400 is positioned within the length L_TTC of the second virtual spring 502 from the own vehicle 300. In this case, the second virtual spring 502 generates a second counter force F_TTC as follows:

$$F\_TTC = k\_TTC \cdot (L\_TTC - X) \quad (10)$$

According to this model, the second virtual spring 502 of the elastic coefficient k_TTC generates the second counter force F_TTC in case that the distance X between the own vehicle 300 and the front vehicle 400 is shorter than the basic length L_TTC. The elastic coefficient k_TTC is the above-mentioned control gain and is a control parameter to be adjusted to provide a proper warning effect.

The second virtual spring 502 will not be compressed if the relative speed Vr is small and if the object-to-object distance X is long (X>L_TTC). In this case, the second counter force F_TTC will not be generated (F_TTC=0). On the other hand, if the relative speed Vr is large and if the object-to-object distance X is short (L_TTC>X), the second virtual spring 502 generates the second counter force F_TTC as a correction value which can be calculated from the expression (10) according to the front-rear distance X.

With these models, the first counter force F_THW is calculated according to the first virtual spring 501 of the length L_THW and the second counter force F_TTC is calculated according to the second virtual spring 502 of the length L_TTC. Of the calculated first and second counter forces F_THW and F_TTC, a larger one is selected as a final correction value Fc.

Figure 15:
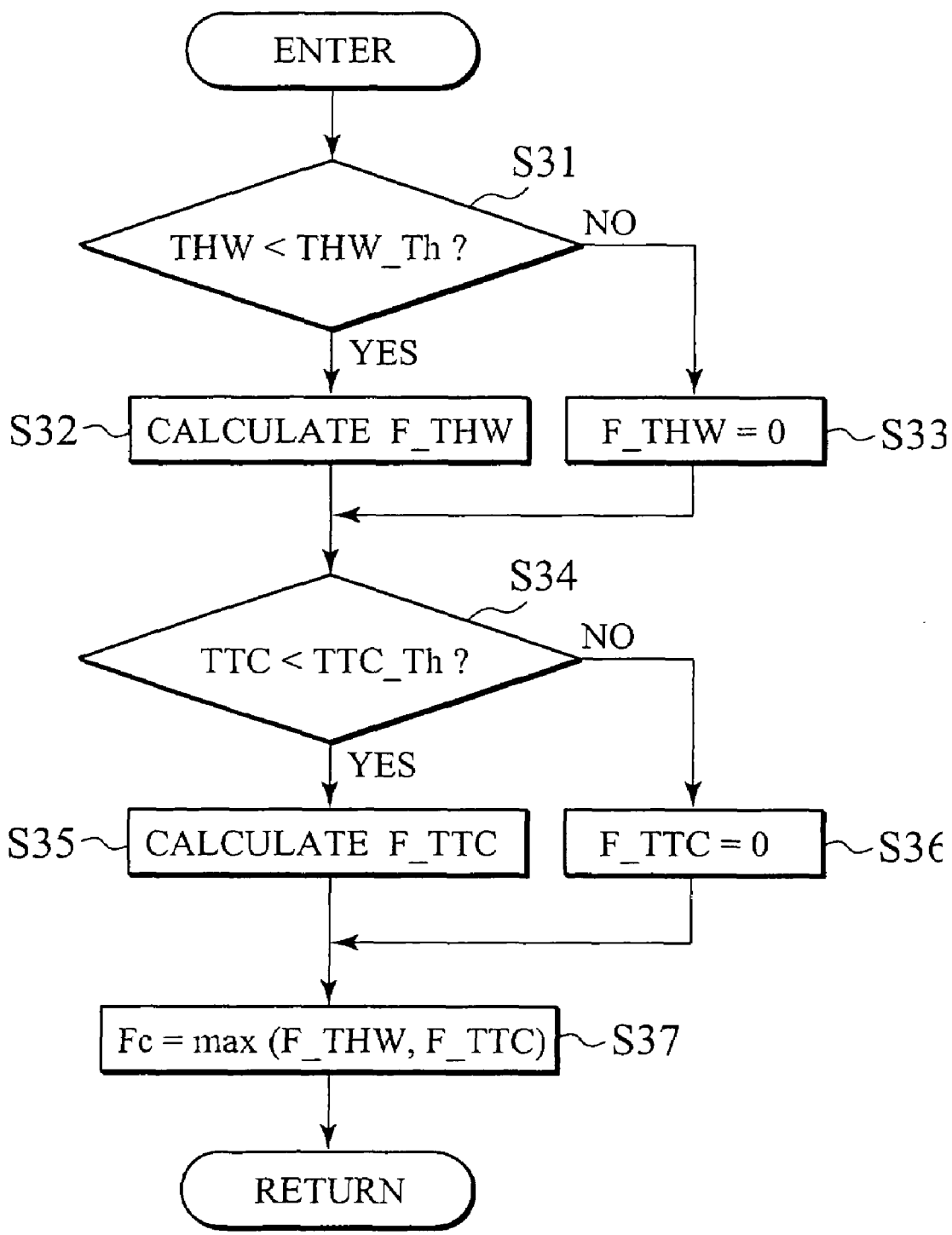
FIG. 15 is a flowchart showing a correction value calculating process of the flowchart of FIG. 8.

FIG. 15 shows a process of calculating such a correction value. This process is based on the idea mentioned above and provides the final correction value Fc according to a relationship between the absolute collision time THW and the absolute collision time threshold THW_Th and a relationship between the relative collision time TTC and the relative collision time threshold TTC_Th.

In step S31, the primary controller 5 determines whether the absolute collision time THW is below the absolute collision time threshold THW_Th. If the absolute collision time THW is below the absolute collision time threshold THW_Th, step S32 is carried out, and if the absolute collision time THW is equal to or greater than the absolute collision time threshold THW_Th, step S33 is carried out.

In step S32, the primary controller 5 calculates the first counter force F_THW from the expression (8) according to the front-rear distance X, and step S34 is carried out. On the other hand, in step S33, the primary controller 5 sets the first counter force F_THW to zero, and step S34 is carried out. In step S34, the primary controller 5 determines whether the relative collision time TTC is below the relative collision time threshold TTC_Th. If the relative collision time TTC is below the relative collision time threshold TTC_Th, step S35 is carried out, and if the relative collision time TTC is equal to or above the relative collision time threshold TTC_Th, step S36 is carried out. In step S35, the primary controller 5 calculates the second counter force F_TTC from the expression (10) according to the front-rear distance X and advances to step S37. On the other hand, in step S36, the primary controller 5 sets the second counter force F_TTC to null and advances to step S37.

In step S37, the primary controller 5 determines a larger one of the calculated first and second counter forces F_THW and F_TTC as the final correction value Fc.

Figure 16:
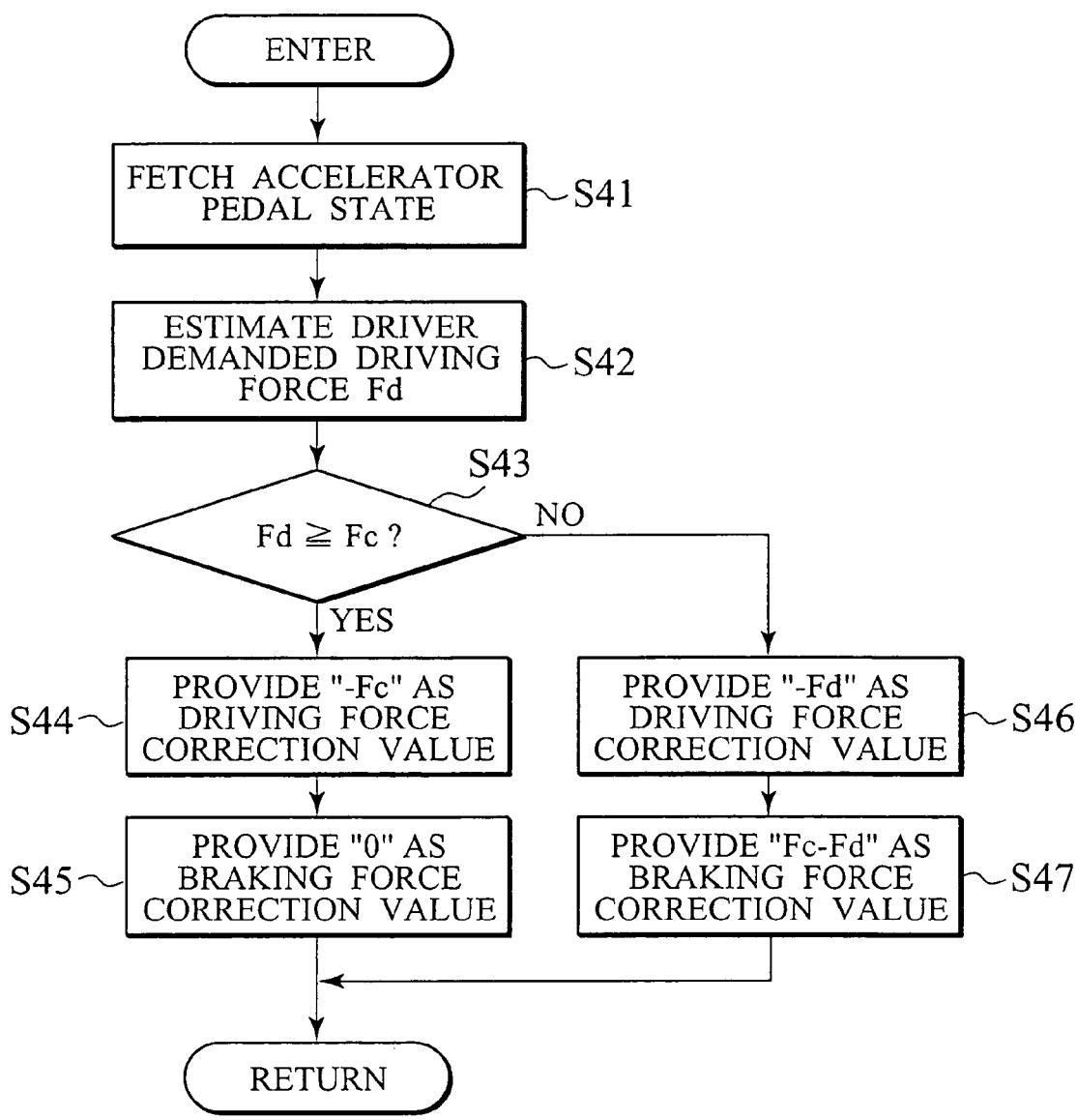
FIG. 16 is a flowchart showing a correction value providing process of the flowchart of FIG. 8.

In this way, the primary controller 5 calculates the correction value Fc in step S9. Then, in step S10, the primary controller 5 provides the calculated correction value Fc to the driving force controller 10 and braking force controller 20. FIG. 16 shows the correction value providing process.

In step S41, the primary controller 5 obtains an accelerator-pedal stroke from information fetched in advance. In step S42, the primary controller 5 estimates a driver demanded driving force Fd according to the accelerator-pedal stroke. More precisely, the primary controller 5 uses a map equivalent to the driver demanded driving force calculating map (FIG. 3) used by the driving force controller 10 and estimates the driver demanded driving force Fd corresponding to the accelerator-pedal stroke. In step S43, the primary controller 5 compares the estimated driver demanded driving force Fd with the correction value Fc and provides a comparison result. Namely, the primary controller 5 determines whether the driver demanded driving force Fd is equal to or greater than the correction value Fc. If the driver demanded driving force Fd is equal to or greater than the correction value Fc (Fd≧Fc), step S44 is carried out, and if the driver demanded driving force Fd is below the correction value Fc (Fd<Fc), step S46 is carried out.

In step S44, the primary controller 5 provides the correction value Fc as a driving force correction value (−Fc) to the driving force controller 10, and in step S45, provides zero as a braking force correction value to the braking force controller 20. On the other hand, the primary controller 5 provides, in step S46, a negative value (−Fd) of the driver demanded driving force Fd as a driving force correction value to the driving force controller 10, and in step S47, provides a difference (Fc−Fd) between the correction value Fc and the driver demanded driving force Fd as a braking force correction value to the braking force controller 20.

Through this correction value providing process conducted by the primary controller 5, the driving force controller 10 receives the sum of the driving force correction value and the driver demanded driving force from the primary controller 5 as a target driving force. At the same time, the braking force controller 20 receives, as a target braking force, the sum of the braking force correction value and a driver demanded braking force from the primary controller 5. This realizes the control of the driving force and braking force of the vehicle according to the correction value Fc.

In the drive control system with this configuration, the driving force controller 10 controls the engine 6 to generate a driving force corresponding to a stroke of the accelerator pedal 4, and the braking force controller 20 controls the brake to generate a braking force corresponding to a stroke of the brake pedal 3.

At this time, the drive control system corrects the engine and brake control values corresponding to the accelerator-pedal and brake-pedal strokes according to whether there is a possibility of the vehicle contacting with an object. Namely, the drive control system receives information about an object in front of the own vehicle from the object detecting processor 2 connected to the radar 30, own vehicle speed information from the vehicle speed sensor 1, and steering angle information from the steering angle sensor, identifies any object having a contact possibility according to the received information; finds a correction value Fc with the use of the correction value obtaining models of FIGS. 13 and 14; calculates a driving force correction value and a braking force correction value according to the correction value Fc; and provides a target driving force and a target braking force corrected by the driving force correction value and braking force correction value to control the engine 6 and brake.

An operation of the drive control system according to an embodiment of the present invention will be explained. The drive control system predicts a course of the own vehicle (step S4). If there are objects (obstacles) in the predicted course, the system identifies objects for which contact possibilities are examined (steps S5 to S7). More precisely, the system calculates an absolute collision time THW and a relative collision time TTC for each object in the predicted course. If there are a plurality of such objects, the absolute collision time THW and relative collision time TTC are calculated for each of the objects (steps S5 and S6). According to the absolute collision times THW and relative collision times TTC, the system identifies an object having a minimum absolute collision time THW and an object having a minimum relative collision time TTC (step S7).

The drive control system sets various parameters according to a lane change operation of the own vehicle (step S8). More precisely, if the own vehicle does not change its lane or if the own vehicle changed its lane and passed a predetermined time after the lane change, the system sets the absolute collision time threshold THW_Th to the normal threshold Th_0, the absolute collision time control gain k_THW to the normal coefficient $k_{THW}\_0$, and the relative collision time control gain k_TTC to the normal coefficient $k_{TTC}\_0$ (THW_Th=Th_0, k_THW=$k_{THW}\_0$, k_TTC=$k_{TTC}\_0$).

On the other hand, if the own vehicle changed its lane and if an elapsed time after the lane change is within the predetermined time, the system sets the absolute collision time threshold THW_Th to the threshold Th_1 that is smaller than the threshold value Th_0, the absolute collision time control gain k_THW to the coefficient $k_{THW}\_1$ that is smaller than the coefficient $k_{THW}\_0$, and the relative collision time control gain k_TTC to the coefficient $k_{TTC}\_1$ that is larger than the coefficient $k_{TTC}\_0$ (THW_Th=Th_1, k_THW=$k_{THW}\_1$, and k_TTC=$k_{TTC}\_1$).

After setting these parameters, the drive control system employs the absolute collision time THW and absolute collision time threshold THW_Th of the object having the minimum absolute collision time THW and finds a first counter force F_THW serving as a correction value. Also, the system employs the relative collision time TTC and relative collision time threshold TTC_Th (separately obtained) of the object having the minimum relative collision time TTC and finds a second counter force F_TTC serving as a correction value (step S9).

More precisely, if the minimum absolute collision time THW is equal to or greater than the absolute collision time threshold THW_Th, i.e., if the minimum absolute collision time is long (the object-to-object distance is longer than the distance L_THW), the first counter force F_THW is set to null (step S33). On the other hand, if the minimum absolute collision time THW is below the absolute collision time threshold THW_Th, i.e., if the minimum absolute collision time is short (the object-to-object distance is equal to or shorter than the distance L_THW), the expression (8) is used to calculate the first counter force F_THW corresponding to the object-to-object distance at the moment according to the absolute collision time threshold THW_Th and absolute collision time control gain k_THW (step S32).

If the minimum relative collision time TTC is equal to or greater than the relative collision time threshold TTC_Th, i.e., if the minimum relative collision time is long (the object-to-object distance is longer than the distance L_TTC), the second counter force F_TTC is set to zero (step S36). On the other hand, if the minimum relative collision time TTC is below the relative collision time threshold TTC_Th, i.e., if the minimum relative collision time is short (the object-to-object distance is equal to or shorter than the distance L_TTC), the expression (10) is used with the relative collision time threshold TTC_Th and relative collision time control gain k_TTC, to calculate the second counter force F_TTC corresponding to the object-to-object distance at the moment (step S35).

Thereafter, the drive control system chooses a larger one of the first and second counter forces F_THW and F_TTC as a final correction value Fc (step S37). The drive control system determines a target driving force according to the final correction value Fc and drives the engine 6 accordingly (step S10).

Namely, if the accelerator pedal 4 is pressed and the driver demanded driving force Fd corresponding to the accelerator-pedal stroke is equal to or greater than the correction value Fc, the drive control system provides a negative value −Fc of the correction value Fc as a driving force correction value to the driving force controller 10 and a braking force correction value of 0 to the braking force controller 20 (steps S44 and S45).

Consequently, the driving force controller 10 receives the sum of the driver demanded driving force and the negative value −Fc as a target driving force and drives the engine 6 to generate the target driving force. As a result, an actual driving force becomes smaller than the driver demanded driving force by Fc, and therefore, the vehicle shows an acceleration behavior that is dull relative to the stroke of the accelerator pedal 4 pressed by the driver. The driver, therefore, senses an acceleration feeling less than expected by pressing the accelerator pedal 4 and is warned by the dull acceleration behavior of a contact possibility that the own vehicle is approaching the front vehicle.

On the other hand, if the estimated driver demanded driving force Fd corresponding to the accelerator-pedal stroke is below the correction value Fc, the drive control system provides a negative value −Fd of the estimated driver demanded driving force Fd as a driving force correction value to the driving force controller 10, as well as the difference (Fc−Fd) between the correction value Fc and the estimated driver demanded driving force Fd as a braking force correction value to the braking force controller 20 (steps S46 and S47).

As a result, the driving force controller 10 receives the sum of the driver demanded driving force and the negative value −Fd as a target driving force and drives the engine 6 so as to generate the target driving force. On the other hand, the braking force controller 20 receives the sum of a driver demanded braking force and the difference (Fc−Fd) as a target braking force and controls the brake so as to generate the target braking force. As a result, the actual driving force becomes substantially zero with respect to the driver demanded driving force. In addition, an actual braking force becomes larger than the driver demanded braking force by the difference (Fc−Fd). Namely, if the driver demanded driving force Fd is below the correction value Fc (Fd<Fc), control by the driving force controller 10 is insufficient to provide the target counter force (correction value Fc). Therefore, the negative driving force correction value −Fd of the driver demanded driving force Fd is supplied to the driving force controller 10, and at the same time, the difference (Fc−Fd) supplementing the shortage is supplied to the braking force controller 20 to realize the counter force (correction value Fc). Namely, excess and shortage in the driving force controller 10 and braking force controller 20 are adjusted and the controllers 10 and 20 are operated in cooperation with each other, to provide the required counter force (Fc) as a whole. This required counter force is applied as driving resistance to the own vehicle. If an accelerator-pedal stroke is below a correction value (Fc), a driver demanded braking force is increased by the shortage (Fc−Fd), and the vehicle shows a deceleration behavior due to the increased braking force. This deceleration behavior is a contact possibility warning with which the driver recognizes that the own vehicle is approaching the front vehicle.

As mentioned above, if a driver demanded driving force Fd corresponding to an accelerator-pedal stroke is equal to or greater than a correction value Fc (Fd≧Fc), then Fd−Fc≧0, and therefore, a positive driving force is left after correcting (by subtraction) the driver demanded driving force Fd by the correction value Fc. Therefore, if a driver demanded driving force Fd corresponding to an accelerator-pedal stroke is greater than a correction value Fc, a braking force correction value is zeroed, and without relying on the braking force controller 20, the correction value Fc is given as a negative driving force correction value to the driving force controller 10 so that correction is made only by the driving force controller 10 to generate the whole of the required counter force. This counter force is applied as driving resistance to the vehicle.

As explained above, the correction value Fc representative of the size of deceleration is chosen from a larger one of the first counter force F_THW based on the absolute collision time THW and the second counter force F_TTC based on the relative collision time TTC. According to this technique, if there is a possibility of the own vehicle contacting a front vehicle due to the absolute collision time (i.e., the object-to-object distance), the first counter force F_THW becomes larger than the second counter force F_TTC, and therefore, the first counter force F_THW is used as a correction value Fc to provide deceleration control as a contact possibility warning. On the other hand, if there is a possibility of contacting the front vehicle due to the relative collision time (i.e., the relative speed), the second counter force F_TTC becomes larger than the first counter force T_THW, and therefore, the second counter force F_TTC is used as a correction value Fc to provide deceleration control as a contact possibility warning. In this way, if there is a possibility of the own vehicle contacting a front vehicle due to any one of the absolute and relative collision times, a contact possibility warning is provided and a counter force corresponding to the absolute or relative collision time that caused the warning is activated. In this way, the absolute and relative collision times are both used to determine a possibility of the own vehicle contacting a front vehicle and provide a contact possibility warning accordingly.

Figure 17:
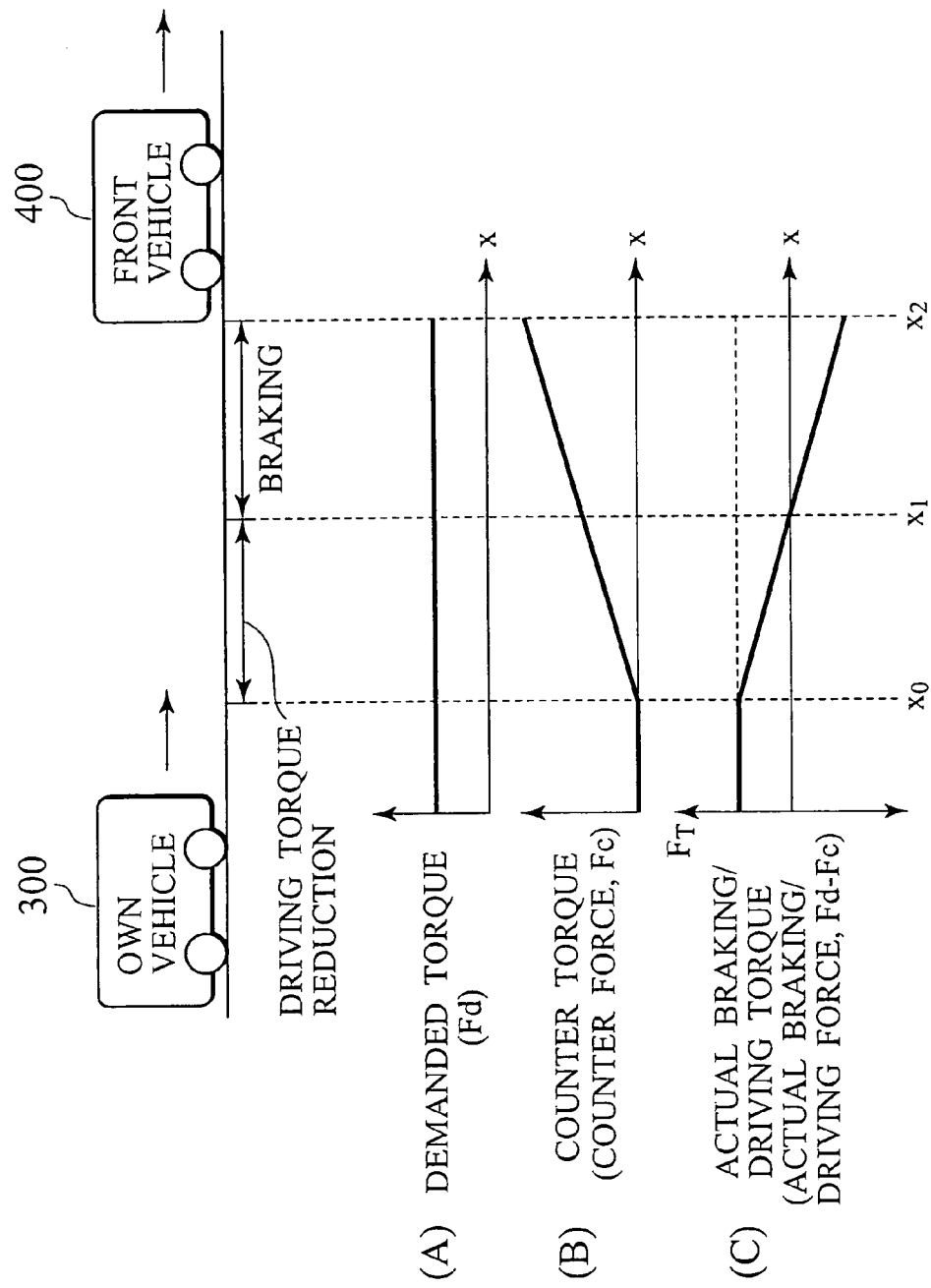
FIG. 17 shows relationships among counter force, demanded torque, and actual driving/braking force.

FIG. 17 shows the behaviors of the own vehicle based on a correction value (counter force) Fc and a driver demanded driving force (demanded torque) Fd. In this example, the accelerator pedal is kept at a constant stroke. The correction value (counter force) Fc is one of the first counter force F_THW and second counter force F_TTC.

When the own vehicle 300 approaches the front vehicle 400 to reduce an object-to-object distance to a predetermined value, the correction value (counter force) Fc is generated as shown in FIG. 17(B). As the object-to-object distance becomes shorter, the correction value (counter force) Fc increases. Since the accelerator-pedal stroke is constant, the driver demanded driving force Fd is constant as shown in FIG. 17(A) irrespective of the object-to-object distance.

In FIG. 17(C), an actual braking/driving force obtained as the difference (Fd−Fc) between the driver demanded driving force Fd and the correction value (counter force) Fc is equal to the driver demanded driving force Fd to a certain object-to-object distance. As the distance becomes shorter than that, the actual braking/driving force decreases. If the object-toobject distance further decreases, the actual braking/driving force decreases to negative. In a region where the actual braking/driving force decreases and the value thereof is positive, a driving force control value supplied to the driving force controller 10 is corrected to reduce driving torque (steps S44 and S45). In a region where the actual braking/driving force decreases and the value thereof is negative, a braking force control value supplied to the braking force controller 20 is corrected to increase a braking force applied to the brake (steps S46 and S47).

Figure 18:
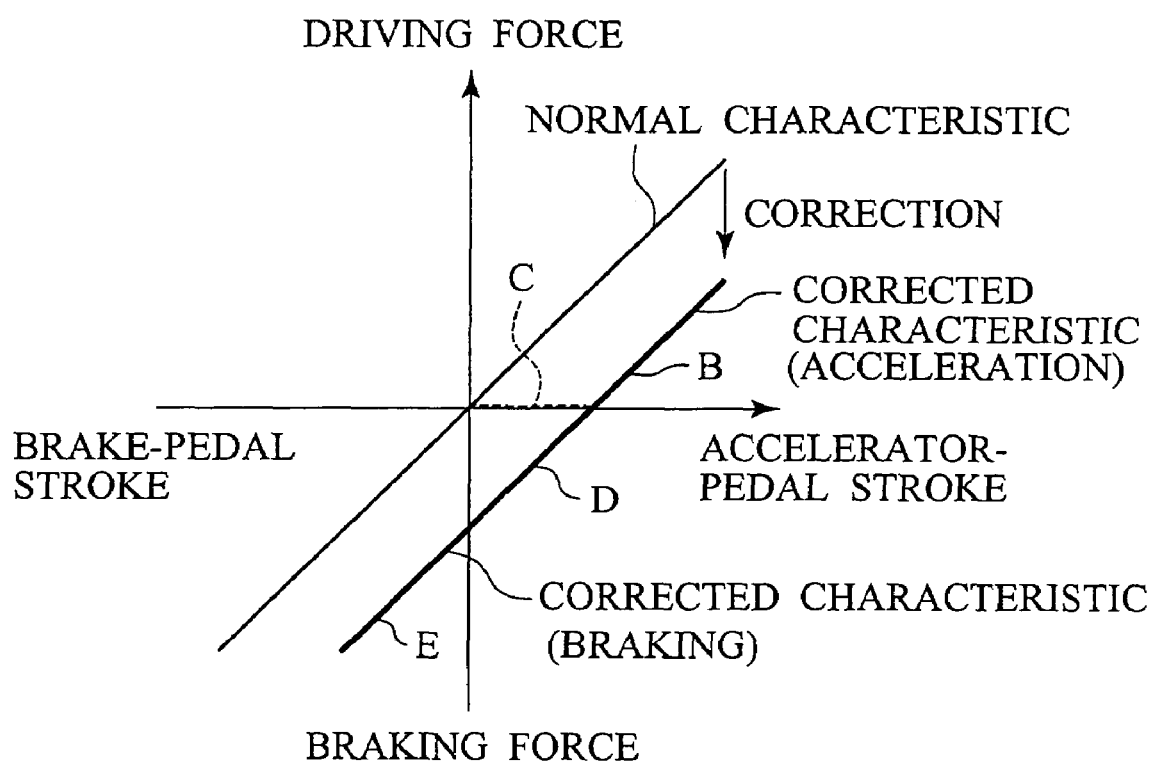
FIG. 18 is a characteristic diagram showing driving force and braking force corrected according to a correction value Fc.

FIG. 18 briefly shows the characteristics of driving force and braking force that are corrected by a correction value Fc. In FIG. 18, with a large accelerator-pedal stroke, a driving force (driver demanded driving force) corresponding to the accelerator-pedal stroke is reduced by the corrected value Fc as depicted by "B" in FIG. 18. On the other hand, with a small accelerator-pedal stroke, a driving force (driver demanded driving force) corresponding to the accelerator-pedal stroke is corrected to zero (i.e., the driver demanded driving force being zeroed) as indicated by dotted line C in FIG. 18, and in addition, a correction is made to generate a braking force that becomes weaker as the accelerator-pedal stroke increases ("D" in FIG. 18). If the brake pedal 3 is pressed, the braking force is corrected to increase according to the correction value Fc ("E" in FIG. 18), so that the driving resistance on the vehicle as a whole may increase in response to the correction value (counter force) Fc.

The effect of the embodiment will be explained. As mentioned above, the counter force of a viral spring is calculated according to an approaching state of the own vehicle to a front vehicle. The calculated counter force is used as an absolute correction value. To enforce the absolute correction value, a driving force correction value and a braking force correction value are provided to the driving force controller 10 and braking force controller 20 to correct a driver demanded driving force and a driver demanded braking force. When the own vehicle approaches the front vehicle to some extent, reduced acceleration or deceleration corresponding to the counter force is applied to the own vehicle, to provide the driver with a contact possibility warning.

The model mentioned above increases the counter force as the own vehicle approaches the front vehicle, so that driving resistance on the own vehicle gradually increases as the own vehicle approaches the front vehicle. Namely, the driving resistance successively changes as the possibility of the own vehicle contacting the front vehicle increases, to provide the driver with a contact possibility warning. In this case, the driver can sense the intensity of the contact possibility in proportion to the magnitude of the driving resistance.

As mentioned above, if the own vehicle changes its lane and if an elapsed time after the lane change is within a predetermined time, the absolute collision time threshold THW_Th is set to the value Th_1 that is smaller than the value Th_0, the absolute collision time control gain k_THW to the coefficient $k_{THW\_1}$ that is smaller than the coefficient $k_{THW\_0}$, and the relative collision time control gain k_TTC to the coefficient $k_{TTC\_1}$ that is larger than the coefficient $k_{TTC\_0}$ (THW_Th=Th_1, k_THW=$k_{THW\_1}$, and k_TTC=$k_{TTC\_1}$).

Figure 19:
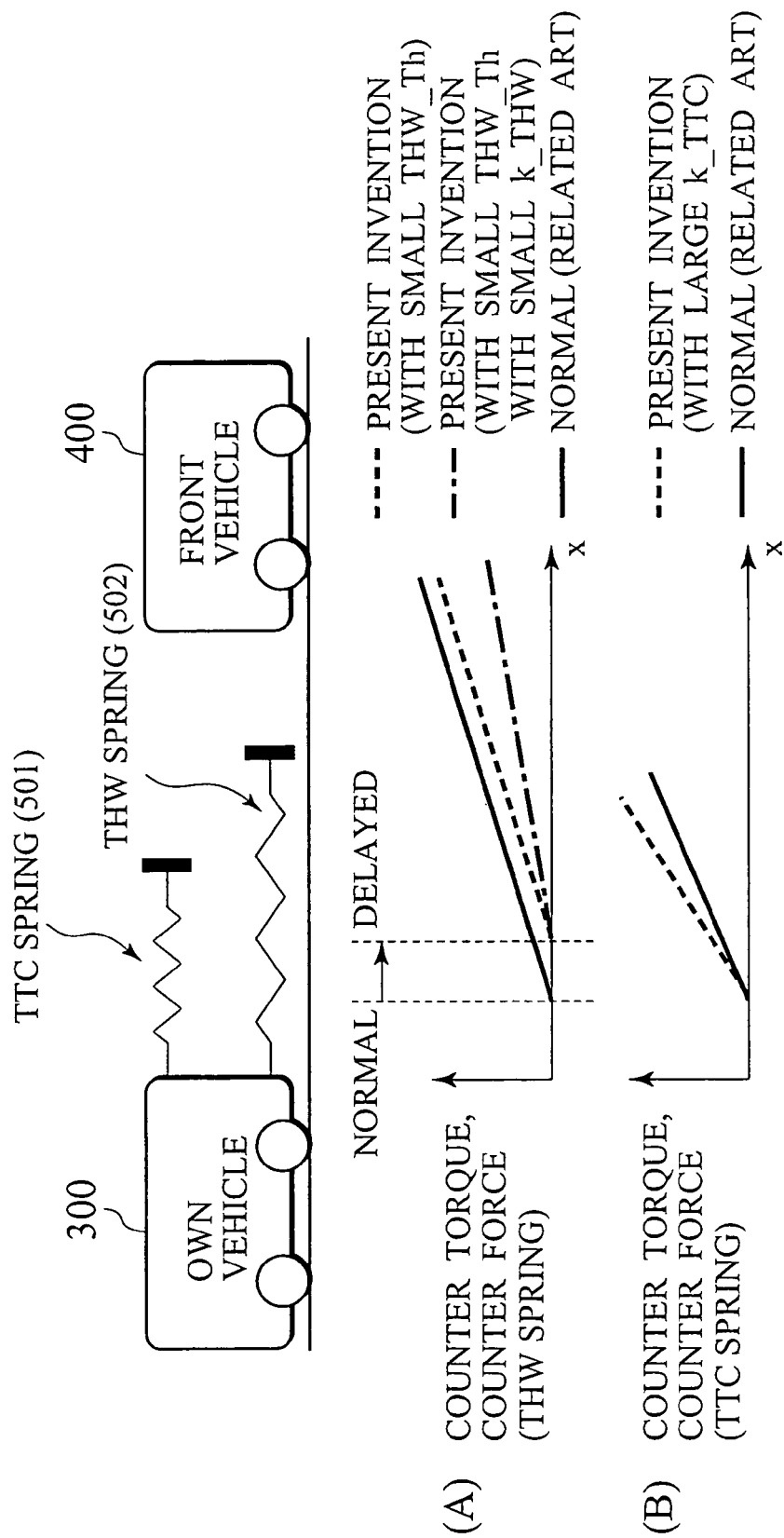
FIG. 19 explains the effect of the first embodiment of the present invention.

In this way, if the own vehicle changes its lane and if an elapsed time after the lane change is within a predetermined time, the absolute collision time THW_Th is set to the small value to set the length L_THW of the vitual spring 500 to a small value. As a result, as shown with a dotted line in FIG. 19(A), a counter force (correction value) is generated according to an object-to-object distance that is shorter than a normal object-to-object distance. Setting the absolute collision time control gain k_THW to a small coefficient decreases the magnitude of the counter force (correction value) smaller than a normal value for the same object-to-object distance as indicated with a dot-and-dash line in FIG. 19(A). On the other hand, setting the relative collision time control gain k_TTC to a large value increases the magnitude of the counter force (correction value) related to the relative collision time as indicated with a dotted line in FIG. 19(B). Consequently, if the own vehicle changes its lane and if an elapsed time after the lane change is within a predetermined time, the generation of the counter force related to an object-to-object distance is delayed and an increment of the magnitude of the counter force relative to an object-to-object distance becomes smaller. On the other hand, the counter force concerning the relative collision time increases an increment relative to a relative collision time. An x-axis of FIG. 19 is fixed to the front vehicle and is oriented in the advancing direction of the front vehicle.

Figure 20:
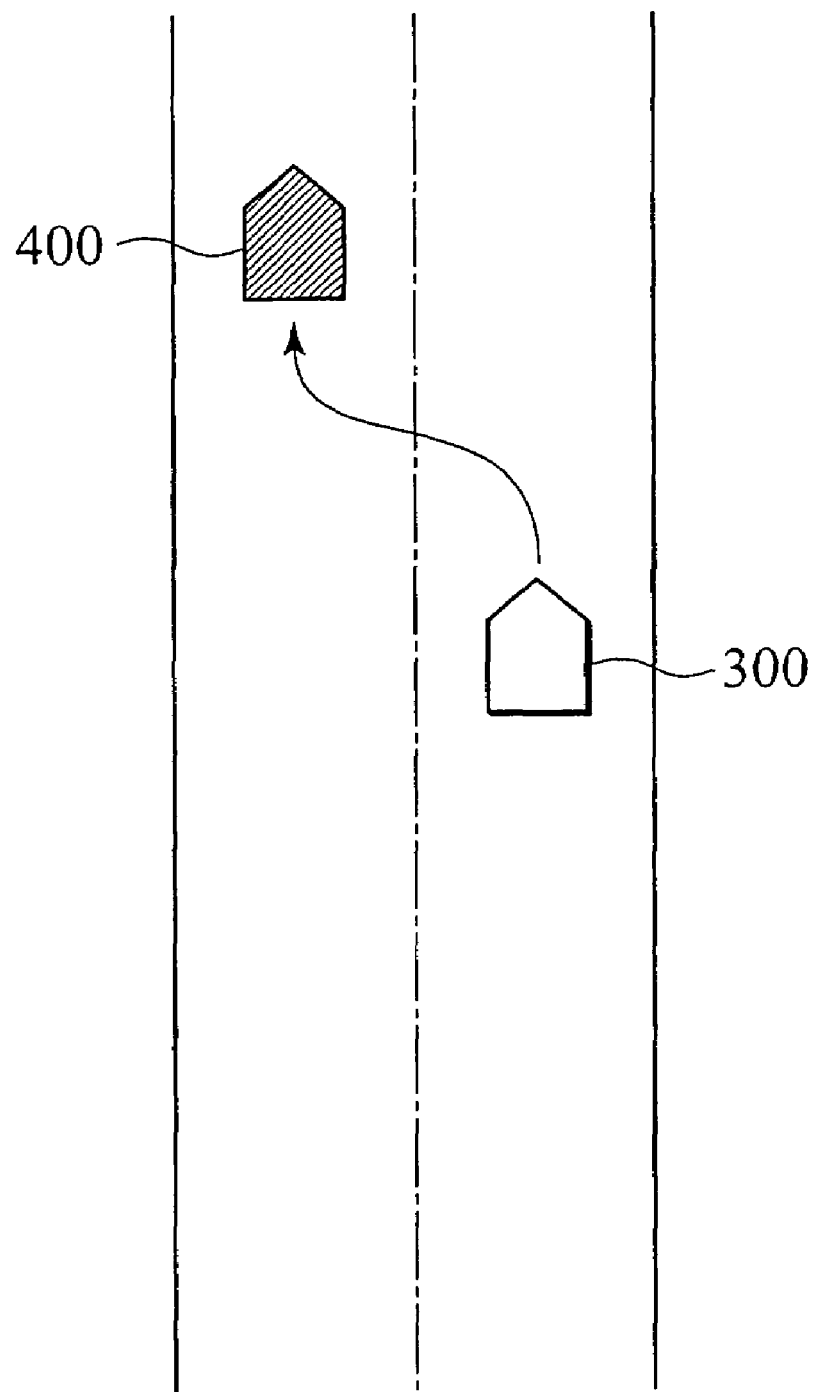
FIG. 20 shows a vehicle changing its lane to a next lane where another vehicle is running.

The driver of the own vehicle may intentionally approach the front vehicle. In this case, the driver is aware that the contact possibility is increasing, and therefore, the driver is ready to quickly decelerate the own vehicle to avoid contacting the front vehicle. In this case, the embodiment detects the intention of the driver and provides a contact possibility warning by generating a counter force in consideration of the driver's intention. For example, in FIG. 20, the own vehicle 300 changes its lane to the next lane where the front vehicle 400 is running. In this case, the driver may be ready to quickly decelerate the own vehicle to avoid contacting the front vehicle 400. Then, the drive control system of the embodiment delays the timing of generation of a counter force related to the absolute collision time and reduces an increment thereof with respect to an object-to-object distance, thereby reducing the influence of the counter force generated in connection with the front vehicle 400 and applied to the own vehicle 300. As a result, the own vehicle 300 can smoothly change its lane and follow the front vehicle 400 in the next lane. Generally, when changing a lane to the next one and following the front vehicle 400 in the next lane, the driver of the own vehicle 300 intends to smoothly change lane with due care not to come in contact with the front vehicle 400. In this case, the present invention can provide the driver with a contact possibility warning without annoying the driver, so that the driver can smoothly change lane and bring the own vehicle 300 behind the front vehicle 400. Namely, the present invention harmonizes the generation of a contact possibility warning with the intention of the driver and provides the contact possibility warning without annoying the driver. The intentional operation by the driver means that the driver is aware of an increasing contact possibility and is conducting a driving operation with a special attention.

On the other hand, there is a possibility that the driver of the own vehicle 300 is unaware of a deceleration of the front vehicle 400. In this case, the possibility of the own vehicle 300 contacting the front vehicle 400 is high. Therefore, the present invention increases an increment of counter force related to the relative collision time. As a result, even if the front vehicle 400 suddenly decelerates, the counter force related to the relative collision time is instantaneously increased in response to the deceleration and is enforced. This counter force works as a force (bring force) larger than a normal force, to effectively provide a contact possibility warning.

If the own vehicle has changed its lane and if a predetermined time has elapsed after the lane change, the normal parameters are set (the special parameters are released) (steps S21 and S22). Namely, a contact possibility warning based on the special parameters is effected only within a necessary period after a lane change. When the predetermined time elapses after a lane change, the driver may drive the own vehicle with the same attention as that before the lane change, and therefore, the normal parameters are set to provide a normal contact possibility warning. This may realize an effective achievement of contact possibility warnings.

In this way, when the driver intentionally shortens a distance between the own vehicle and a front vehicle, the present invention delays the timing of a contact possibility warning based on an object-to-object distance. Namely, the present invention properly provides a contact possibility warning in consideration of an actual situation, thereby increasing the effect of the warning.

Second Embodiment

Figure 21:
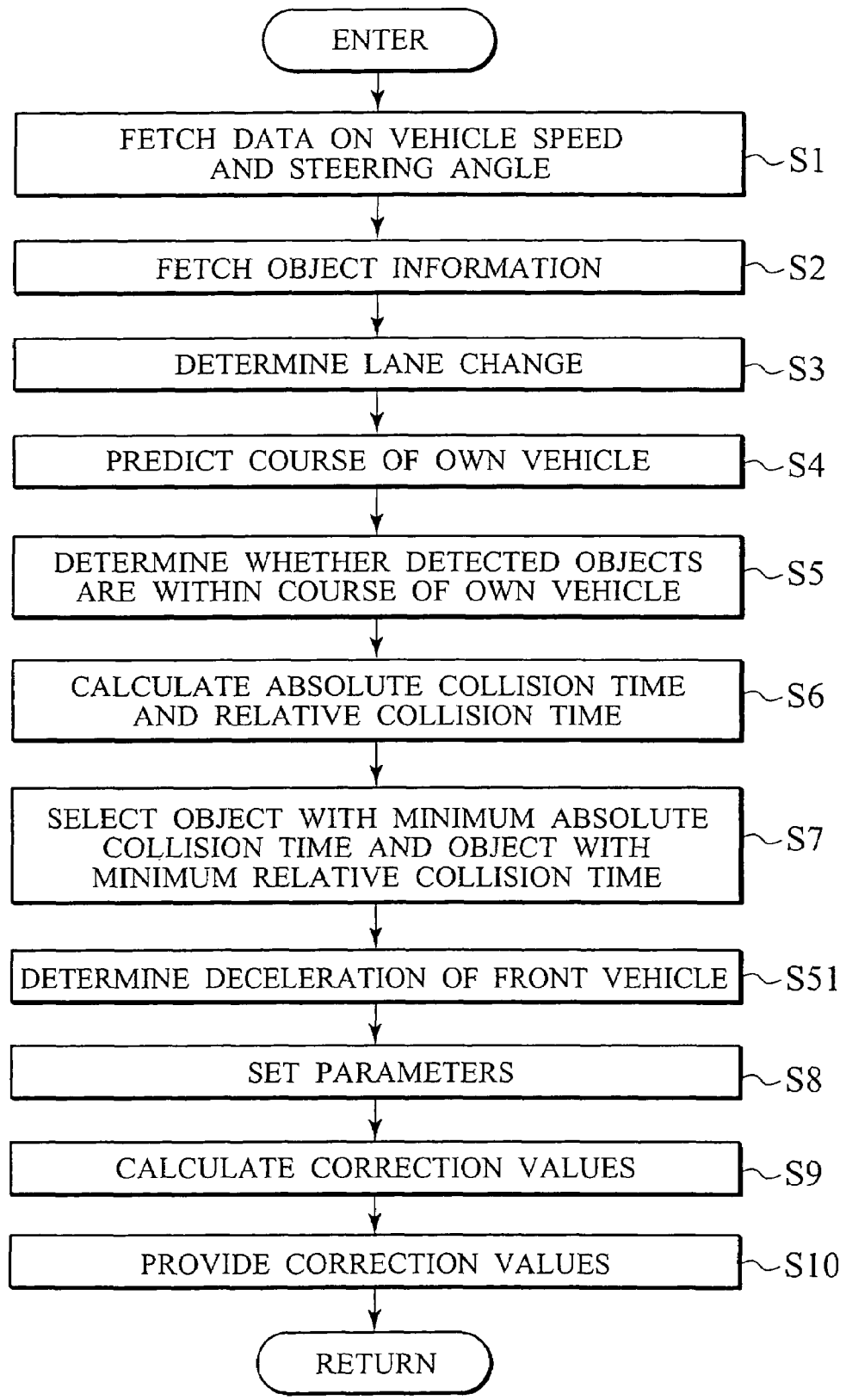
FIG. 21 is a flowchart showing steps carried out by a primary controller in a drive control system of a vehicle employing a warning apparatus according to a second embodiment of the present invention.

The second embodiment of the present invention employs the same components as those of the first embodiment shown in FIG. 1 and sets the parameters mentioned above in consideration of a deceleration behavior of a front vehicle. FIG. 21 shows steps carried out by the primary controller 5 according to the second embodiment. Compared with the steps as shown in FIG. 8, the steps of FIG. 21 additionally include step S51 to determine the deceleration of a front vehicle. This deceleration determining process determines the deceleration of a front vehicle according to, for example, a relative speed $\Delta V$ between the own vehicle and the front vehicle. After the deceleration determining process, the second embodiment proceeds to step S8 to set the parameters.

Figure 22:
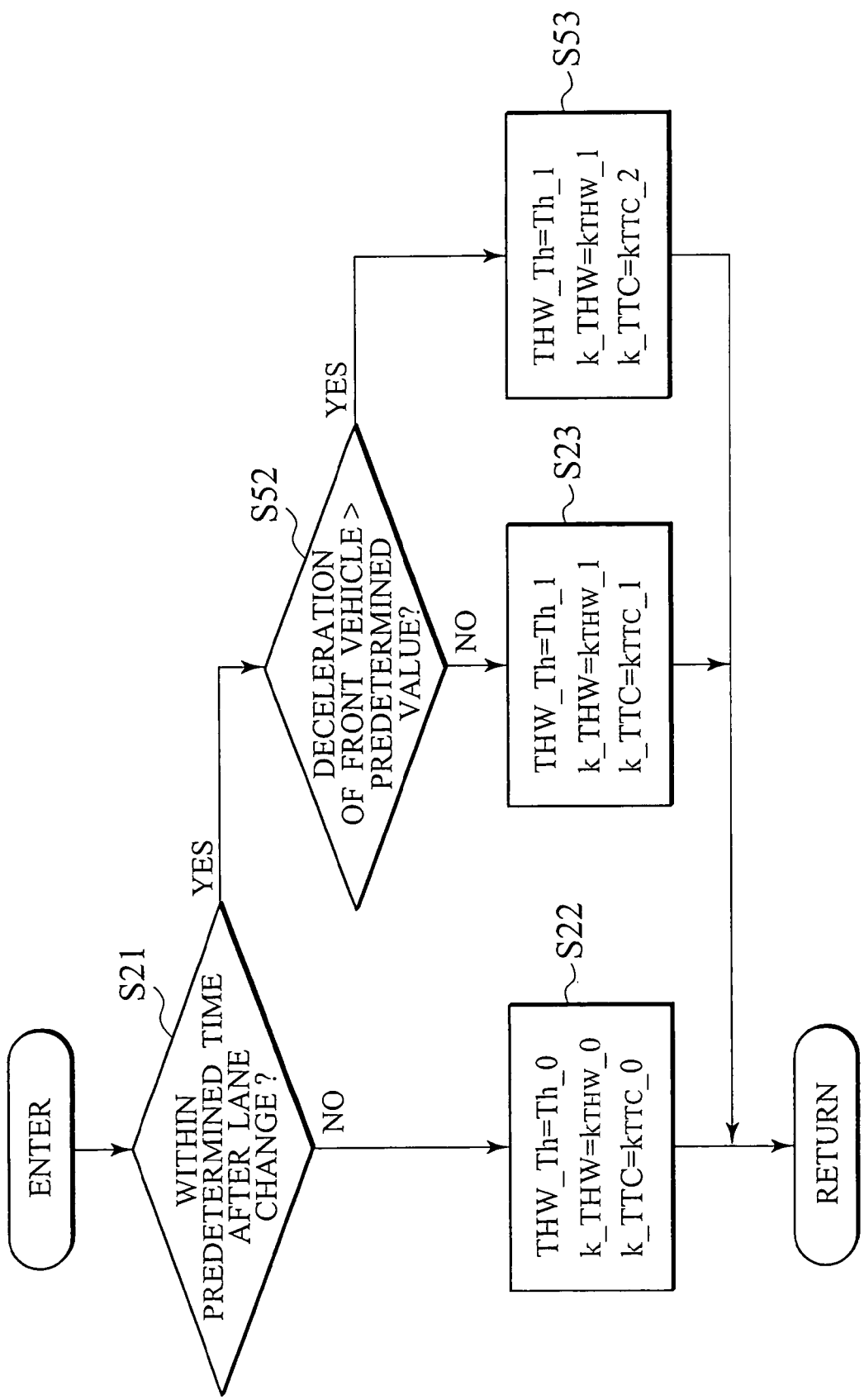
FIG. 22 is a flowchart showing a parameter setting process of the flowchart of FIG. 21.

FIG. 22 shows the parameter setting process. Compared with the parameter setting process of FIG. 12, the process of FIG. 22 additionally has step S52. If an elapsed time after a lane change is within a predetermined value in step S21, the primary controller 5 proceeds to step S52.

In step S52, the primary controller 5 refers to the deceleration determination result of step S51 shown in FIG. 21 and determines whether the deceleration of the front vehicle is greater than a predetermined value. If the deceleration of the front vehicle is greater than the predetermined value, the primary controller 5 proceeds to step S53, and if the deceleration of the front vehicle is equal to or lower than the predetermined value, to step S23.

In step S53, the primary controller sets the absolute collision time threshold THW_Th to Th_1 (THW_TH=Th_1), the absolute collision time control gain k_THW to $k_{THW\_}1$ (k_THW=$k_{THW\_}1$), and the relative collision time control gain k_TTC to $k_{TTC\_}2$ (k_TTC=$k_{TTC\_}2$). The coefficient $k_{THW\_}2$ is larger than the coefficient $k_{THW\_}1$. Namely, a relationship such that $k_{THW\_}2 > k_{THW\_}1 > k_{THW\_}0$ is satisfied. After setting these parameters in step S53, the primary controller 5 completes the process of FIG. 22.

In FIG. 22, steps S22 and S23 set the parameters to the same values as those of the first embodiment. In the processes carried out by the primary controller 5 according to the second embodiment, if the own vehicle changes its lane, if an elapsed time after the lane change is within a predetermined value, and if the front vehicle is decelerating at a predetermined deceleration value, the relative collision time control gain k_TTC is set to $k_{TTC\_}2$ (k_TTC=$k_{TTC\_}2$) in step S53. The coefficient $k_{THW\_}2$ is larger than the coefficients $k_{THW\_}0$ and $k_{THW\_}1$. In this case, the magnitude of the counter force (correction value) related to the relative collision time shown in FIG. 19(B) becomes larger than that of the first embodiment. As a result, if the front vehicle in the lane to which the own vehicle has moved decelerates at a great deceleration rate, the second embodiment further increases the counter force to provide the driver with a contact possibility warning to cope with the sudden deceleration of the front vehicle.

Third Embodiment

Figure 23:
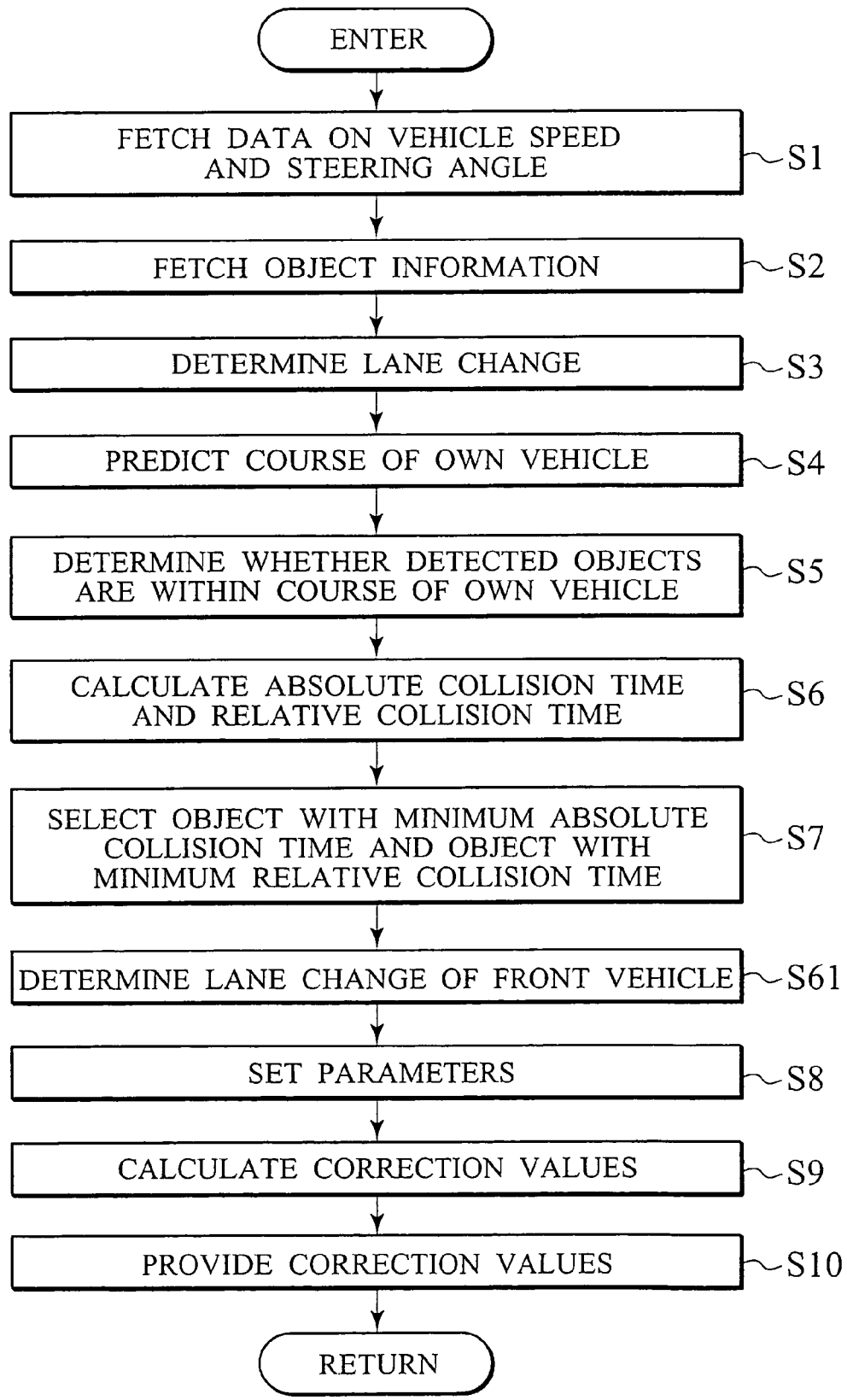
FIG. 23 is a flowchart showing steps carried out by a primary controller in a drive control system of a vehicle employing a warning apparatus according to a third embodiment of the present invention.

The third embodiment of the present invention employs the same components as those of the first embodiment shown in FIG. 1 and considers a lane change of a front vehicle when setting the parameters mentioned above. FIG. 23 shows steps carried out by the primary controller 5 according to the third embodiment. Compared with the flowchart of FIG. 8, the flowchart of FIG. 23 additionally includes step S61 to determine whether a front vehicle is changing its lane. This determination of whether a front vehicle is changing its lane refers to a detection result provided by, for example, the radar 30. If the own vehicle is changing its lane and if a front vehicle detected by the radar 30 shows no change, it is determined that the front vehicle detected by the radar 30 is changing its lane together with the own vehicle. The determination of whether the own vehicle is changing its lane is carried out according to the technique explained in the first embodiment with reference to FIG. 9. After the determination of the front vehicle's lane change, the parameters are set in step S8.

Figure 24:
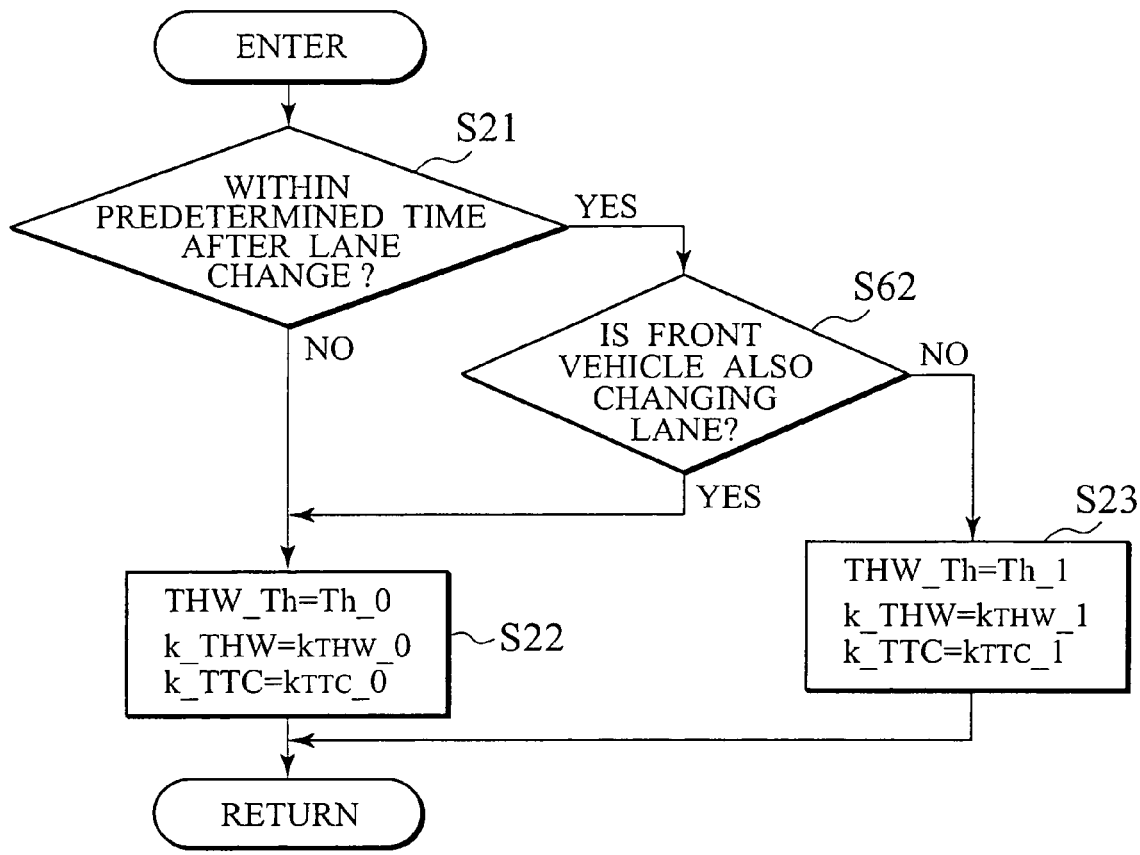
FIG. 24 is a flowchart showing a parameter setting process of the flowchart of FIG. 23.

FIG. 24 shows the details of the parameter setting process. Compared with the steps shown in FIG. 12, the steps of FIG. 24 additionally include step S62. Namely, the primary controller 5 advances to step S62 if step S21 determines that an elapsed time after the lane change is within a predetermined time.

In step S62, the primary controller 5 refers to a result of the lane change determination made in step S61 of FIG. 23 and determines whether the front vehicle is changing its lane together with the own vehicle. If the front vehicle and the own vehicle are both changing lanes to the same lane, the primary controller 5 proceeds to step S22, and if the front vehicle is not changing its lane together with the own vehicle, e.g., if the own vehicle alone is changing its lane, proceeds to step S23.

Steps S22 and S23 set the parameters similarly to the first embodiment. In the processes carried out by the primary controller 5 according to the third embodiment, if the own vehicle is changing its lane, if an elapsed time after the lane change is within a predetermined time, and if the front vehicle is changing lane to the same lane to which the own vehicle is changing lane, normal parameters are set. Namely, as with the case where the own vehicle is not changing lane or the own vehicle changes lane and an elapsed time after the lane change is above the predetermined time, the primary controller 5 sets the absolute collision time threshold THW_Th to the normal threshold Th_0, the absolute collision time control gain k_THW to the normal coefficient $k_{THW\_}0$, and the relative collision time control gain k_TTC to the normal coefficient $k_{TTC\_}0$ (THW_Th=Th_0, k_THW=$k_{THW\_}0$, k_TTC=$k_{TTC\_}0$).

Figure 25:
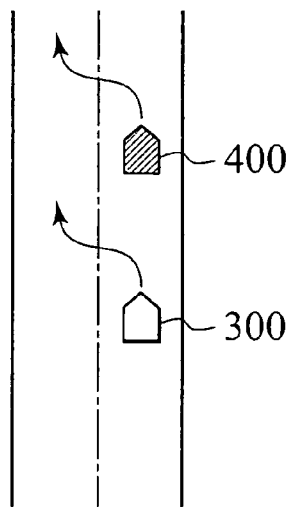
FIG. 25 shows a vehicle and a front vehicle together changing a lane to another.

When the front vehicle is changing lane to the same lane to which the own vehicle is changing lane as shown in FIG. 25, it can be said that the driver of the own vehicle is intentionally changing its lane by following the front vehicle. Accordingly, the embodiment sets normal parameters similarly to the case when the own vehicle follows a front vehicle in the same lane without changing the lane. On the other hand, if when the own vehicle changes lane, an elapsed time after the lane change is within a predetermined time, and if the own vehicle changes lane alone, the embodiment sets the absolute collision time threshold THW_Th to the threshold Th__1 that is smaller than the threshold value Th__0, the absolute collision time control gain k_THW to the coefficient $k_{THW}$__1 that is smaller than the coefficient $k_{THW}$__0, and the relative collision time control gain k_TTC to the coefficient $k_{TTC}$__1 that is larger than the coefficient $k_{TTC}$__0 (THW_Th=Th=Th__1, k_THW=$k_{THW}$__1, and k_TTC=$k_{TTC}$__1). This delays the timing of the generation of the counter force based on absolute collision time, reduces an increment of the counter force relative to the absolute collision time, and increases an increment of the counter force based on the relative collision time.

In this way, if the own vehicle changes lane and if the lane change is done to follow a front vehicle, the third embodiment sets the normal parameters. When the own vehicle changes lane to keep following a front vehicle, it can be said that the driver of the own vehicle is paying steady attention to the front vehicle irrespective of the lane change, and therefore, the embodiment sets normal parameters to maintain the operation of providing a standard contact possibility warning. This results in effectively providing the contact possibility warning.

Fourth Embodiment

Figure 26:
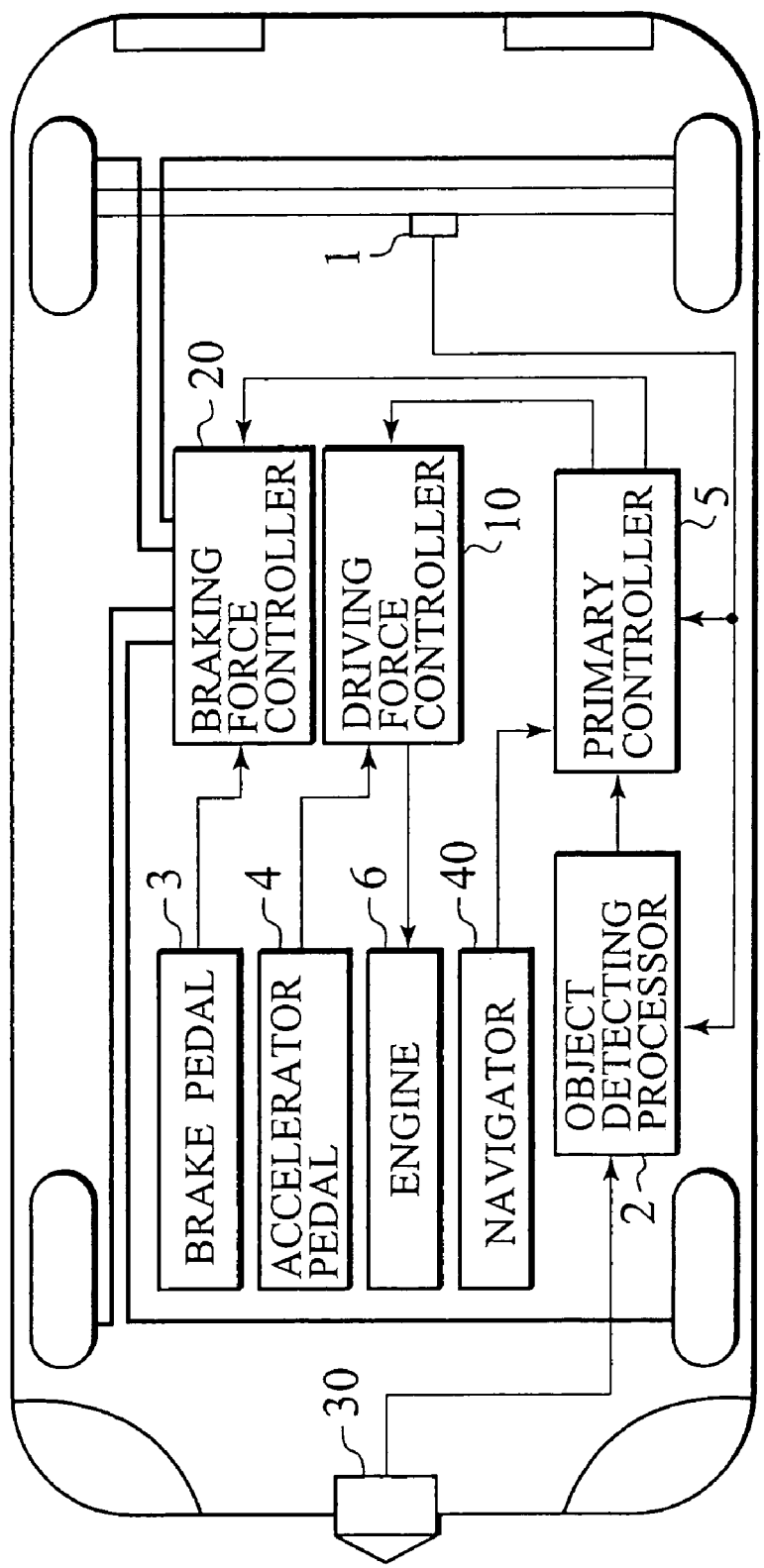
FIG. 26 shows a drive control system of a vehicle employing a warning apparatus according to a fourth embodiment of the present invention.

The fourth embodiment of the present invention classifies a road along which the own vehicle is running when setting the parameters mentioned above. FIG. 26 shows a drive control system of a vehicle employing a warning apparatus according to the fourth embodiment. As shown in FIG. 26, the drive control system of this embodiment includes a navigator 40 in addition to the components of the first embodiment shown in FIG. 1.

Figure 27:
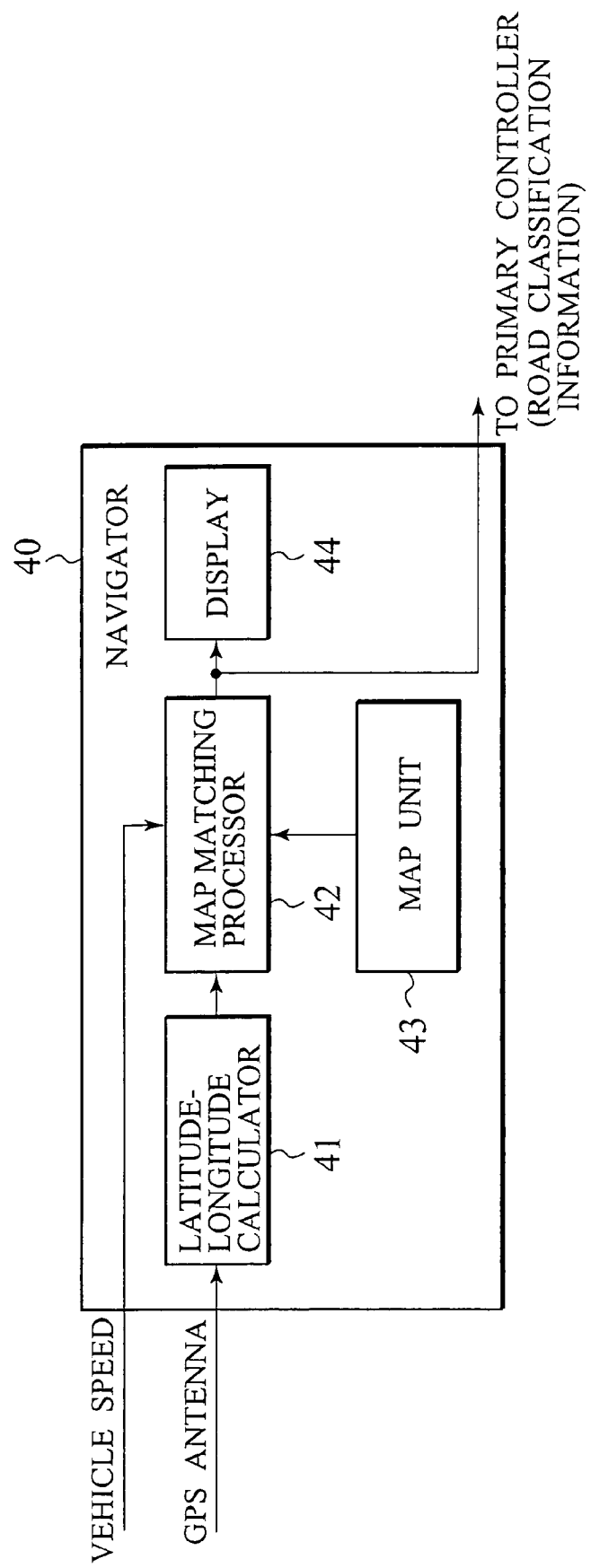
FIG. 27 is a block diagram showing a navigator in the drive control system of the fourth embodiment.

FIG. 27 shows an exemplary structure of the navigator 40. In FIG. 27, the navigator 40 has a latitude-longitude calculator 41, a map matching processor 42, a map unit 43, and a display 44. The latitude-longitude calculator 41 refers to satellite position and time information sent from a GPS (Global Positioning System) antenna and calculates the latitude and longitude of the own vehicle. The map unit 43 stores digital map information. The digital map in the map unit is linked with a database storing road classifications. The map matching processor 42 refers to the latitude and longitude information provided by the latitude-longitude calculator 41 and the map information in the map unit 43 and specifies the position of the own vehicle on the map. The display 44 displays the map and the position of the own vehicle on the map according to the information specified by the map matching processor 42.

Figure 28:
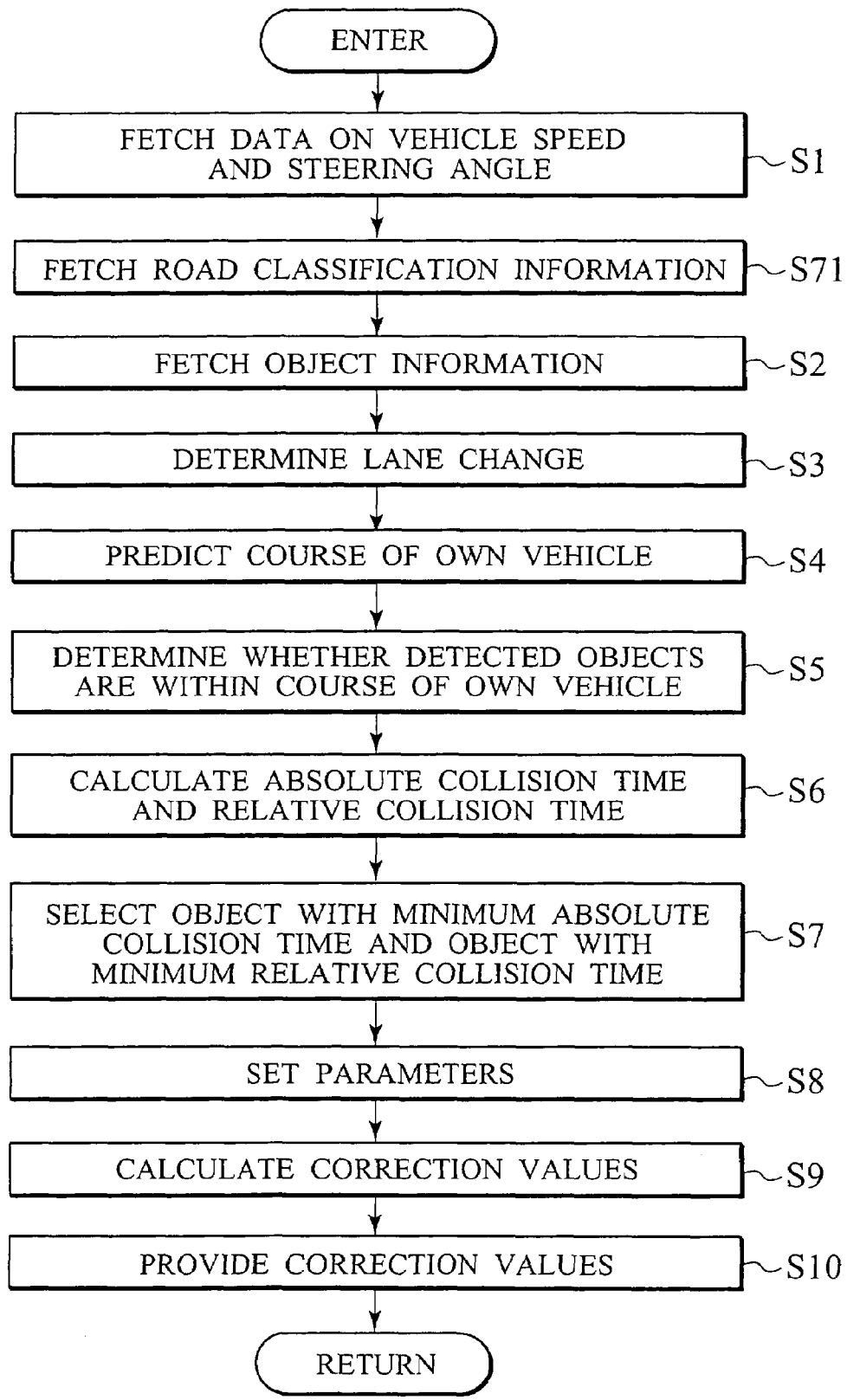
FIG. 28 is a flowchart showing steps carried out by a primary controller in the drive control system of the fourth embodiment.

According to the road determined by the map matching processor 42 as a road on which the own vehicle is running, the navigator 40 transmits road classification information read from the database to a primary controller 5. The primary controller 5 carries out steps shown in FIG. 28. Compared with the steps of FIG. 8, the steps of FIG. 28 additionally include step S71 to fetch road classification information. This step of fetching road classification information is a process in which the primary controller 5 fetches road classification information from the navigator 40.

FIG. 29 shows an example of road classification information handled by the road classification information fetching step. The road classification information involves four road classes of "Expressway," "Other toll roads (including bypasses)," "First-class national road," and "Other open roads." According to the structural characteristics of these road classes, the road classification information further classifies the roads by assigning numbers (classification codes) to them. For example, the "Expressway" is classified into "11. Cruising lane," "12. Entrance lane," "13. Exit lane," "14. Entrance lane for service area," "15. Exit lane from service area," and "16. Near tollgate." "Other toll roads (including bypasses)" is classified into "21. Cruising lane," "22. Entrance lane," "23. Exit lane," "24. Entrance lane for service area," "25. Exit lane from service area," and "26. Near tollgate." The "First-class national road" is classified into "31. Cruising lane" and "32. Near separation or intersection." "Other open roads" is classified into "41. Cruising lane" and "42. Near separation or intersection."

The primary controller 5 fetches a classification of the road on which the own vehicle is running from the navigator 40 as a classification code. Like the first embodiment, the primary controller 5 executes steps S2 to S7 to fetch object information and select an object according to absolute collision times and relative collision times, and executes step S8 to set parameters.

Figure 30:
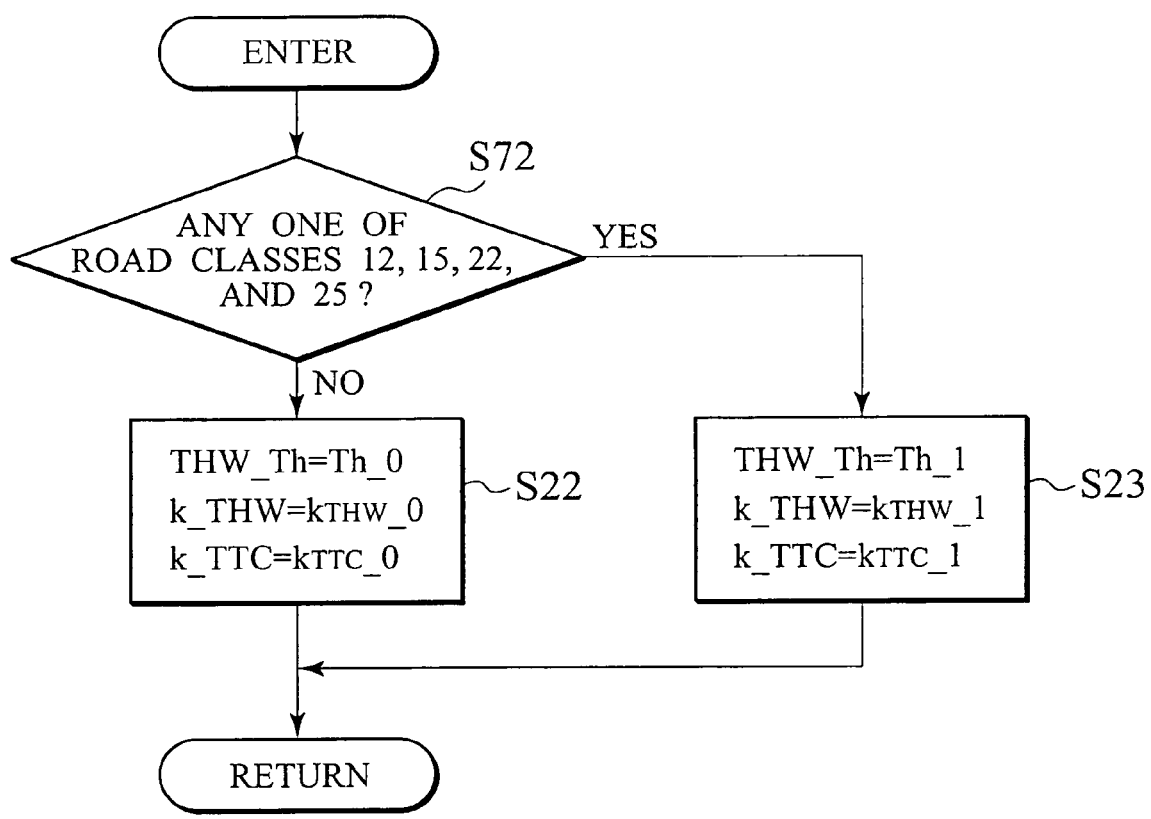
FIG. 30 is a flowchart showing a parameter setting process of the flowchart of FIG. 28.

FIG. 30 is a flowchart showing the parameter setting process. Compared with the flowchart of FIG. 12, the flowchart of FIG. 30 includes step S72 instead of step S21 of FIG. 12. In step S72, the primary controller 5 determines whether the road on which the own vehicle is running has one of the road classification codes 12, 15, 22, and 25. If it has one of the codes 12, 15, 22, and 25, step S23 is carried out, and if not, step S22 is carried out.

Steps S22 and S23 of FIG. 30 set parameters similarly to the first embodiment. If the road classification code is none of the codes 12, 15, 22, and 25, the absolute collision time threshold THW_Th is set to the normal threshold Th__0 (THW_TH=Th__0), the absolute collision time control gain k_THW is set to the normal $k_{THW}$__0 (k=k_THW=$k_{THW}$__0), and the relative collision time control gain k_TTC is set to the normal $k_{TTC}$__0 (k_TTC=$k_{TTC}$__0). On the other hand, if the road classification code is one of the codes 12, 15, 22, and 25, the absolute collision time threshold THW_Th is set to Th__1 (THW_TH=Th__1) that is smaller than the value Th__0, the absolute collision time control gain k_THW is set to $k_{THW}$__1 (k_THW=$k_{THW}$__1) that is smaller than the coefficient $k_{THW}$__0, and the relative collision time control gain k_TTC is set to $k_{TTC}$__1 (k_TTC=$k_{TTC}$__1) that is greater than the coefficient $k_{TTC}$__0.

In this way, if the road classification code is one of the codes 12, 15, 22, and 25, i.e., if the road on which the own vehicle is running is one of an entrance lane for an expressway, an exit lane from a service area on an expressway, an entrance lane for a toll road, and an exit lane from a service area on a toll road, the absolute collision time threshold THW_Th is set to Th__1 that is smaller than the value Th-0, the absolute collision time control gain k_THW is set to $k_{THW}$__1 that is smaller than the coefficient $k_{THW}$__0, and the relative collision time control gain k_TTC is set to $k_{TTC}$__1 that is greater than the coefficient $k_{TTC}$__0.

At an entrance lane for an expressway or an exit lane from a service area, the own vehicle changes lane with the driver being ready to, for example, quickly decelerate to avoid hitting a front vehicle. Accordingly, for an entrance lane of an expressway or an exit lane from a service area, the same parameters as those for the lane change of the first to third embodiments are set to delay the timing of generation of the counter force based on the absolute collision and reduces an increment of the counter force relative to the absolute collision time, thereby reducing the influence of the counter force that is generated in connection with the front vehicle 400 and is applied to the own vehicle 300. Consequently, the driver can receive a contact possibility warning without annoyance.

Fifth Embodiment

The fifth embodiment of the present invention provides a contact possibility warning only by controlling braking force. Unlike the first to fourth embodiments that provide a contact possibility warning through the cooperation of driving force control and braking force control, the fifth embodiment provides a contact possibility warning only through braking force control.

Figure 31:
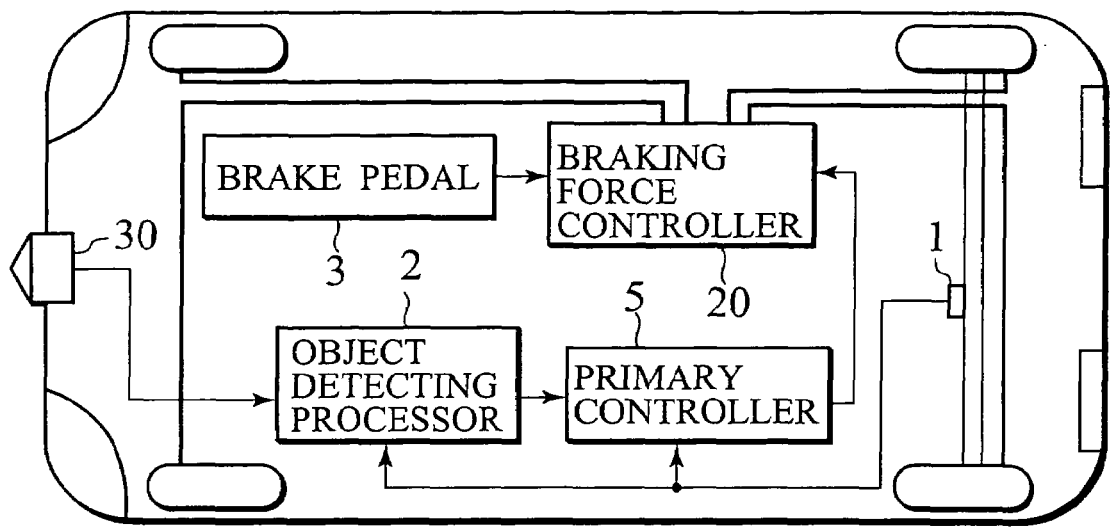
FIG. 31 shows a drive control system of a vehicle employing a warning apparatus according to a fifth embodiment of the present invention.

FIG. 31 shows a drive control system of a vehicle employing a warning apparatus according to the fifth embodiment. Compared with the system of FIG. 1, the drive control system of FIG. 31 has no driving force controller 10. A primary controller 5 of the fifth embodiment achieves the same steps as those of the first embodiment of FIG. 8. A correction value calculating process of the fifth embodiment is carried out in step S9 like the first embodiment.

Namely, the length L_THW of a first virtual spring 501 is obtained from a vehicle speed Vh and an absolute collision time threshold THW_Th as follows:

$$L\_THW = THW\_Th \cdot Vh \quad (7')$$

The length L_TTC of a second virtual spring 502 is obtained from a relative vehicle speed Vr and a relative collision time threshold TTC_Th as follows:

$$L\_TTC = TTC\_Th \cdot Vr \quad (9')$$

According to the differences between the values L_THW and L_TTC and an object-to-object distance (a distance between vehicles) X, i.e., "L_THW−X" and "L_TTC−X" and the expressions (8) and (10), first and second counter forces F_THW and F_TTC serving as correction values are calculated. The first counter force F_THW changes according to the length (L_THW−X) as indicated with a continuous line in FIG. 32, and the second counter force F_TTC changes according to the length (L_TTC−X) as indicated with a continuous line in FIG. 33.

Figure 34:
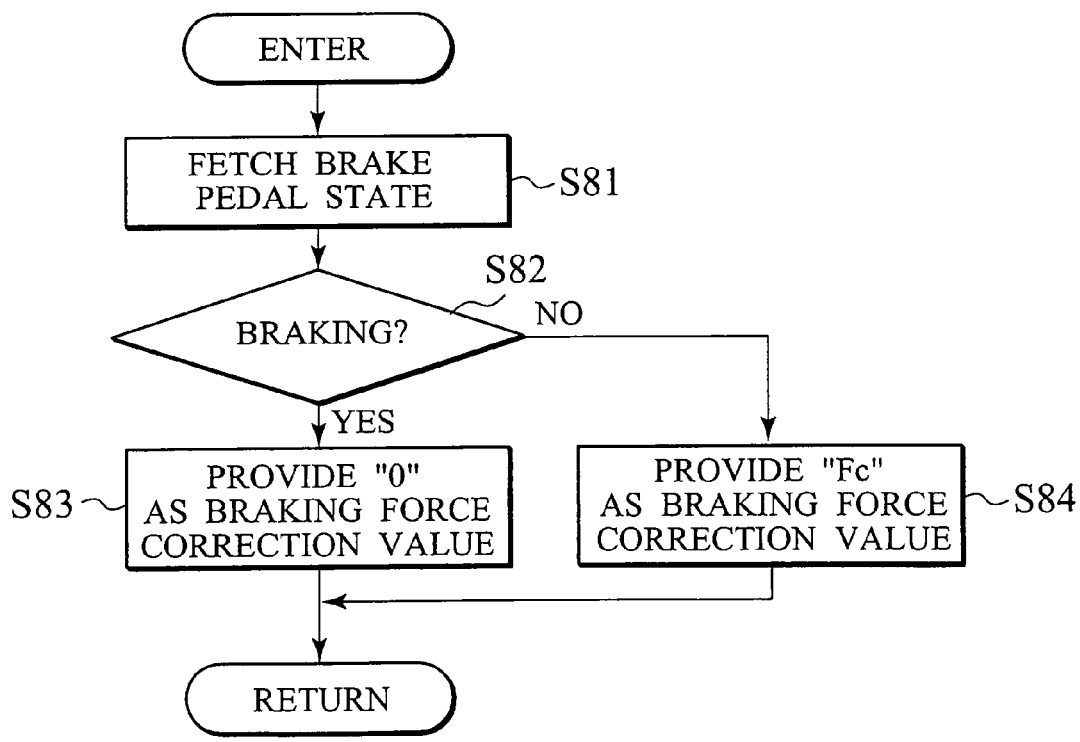
FIG. 34 is a flowchart showing a correction value providing process of the fifth embodiment.

The primary controller 5 chooses a larger one of the calculated first and second counter forces F_THW and F_TTC as a final correction value Fc (step S37 of FIG. 15). In the correction value providing process of step S10 of FIG. 8, the primary controller 5 carries out steps shown in FIG. 34.

In step S81, the primary controller 5 fetches information about a state of the brake pedal 3. In step S82, the primary controller 5 refers to the brake pedal state information fetched in step S81 and determines whether it is in a braking operation. In case of a braking operation, the primary controller 5 advances to step S83, and otherwise, to step S84.

In step S83, the primary controller 5 provides the braking force controller 20 with a braking force correction value of 0. On the other hand, in step S84, the primary controller 5 provides the braking force controller 20 with the correction value Fc calculated in the correction value calculating process of step S9 as a braking force correction value. When step S84 provides the correction value Fc as a braking force correction value, it is not in a braking operation, and therefore, the braking force controller 20 uses the correction value Fc as a target braking force to control the brake to achieve the target braking force.

In the processes carried out by the primary controller 5 according to the fifth embodiment, if it is not in a braking operation, the fifth embodiment provides the braking force controller 20 with the correction value Fc, and the braking force controller 20 applies a braking force equal to the correction value Fc to the own vehicle. As a result, only with the braking force controller 20, i.e., only with the brake, an early warning based on the braking force can be given to the driver similarly to the first and second embodiments.

In case of a braking operation, zero is provided as a braking force correction value. Namely, if it is in a braking operation, no correction based on a correction value (counter force) is carried out, and the brake is controlled according to a driver demanded braking force as it is. This suppresses a contact possibility warning based on a braking force. Namely, a contact possibility warning is provided in consideration of driver's intention.

The parameter setting process according to the fifth embodiment will be considered. In connection with this, the parameter setting process (FIG. 12) of the first embodiment will be considered. If the own vehicle changes lane and if an elapsed time after the lane change is within a predetermined time, the absolute collision time threshold THW_Th is set to Th_1 (THW_TH=Th_1) that is smaller than the threshold value Th_0, the absolute collision time control gain k_THW is set to $k_{THW}\_1$ (k_THW=$k_{THW}\_1$) that is smaller than the coefficient $k_{THW}\_0$, and the relative collision time control gain k_TTC is set to $k_{TTC}\_1$ (k_TTC=$k_{TTC}\_1$) that is greater than the coefficient $k_{TTC}\_0$.

Figure 32:
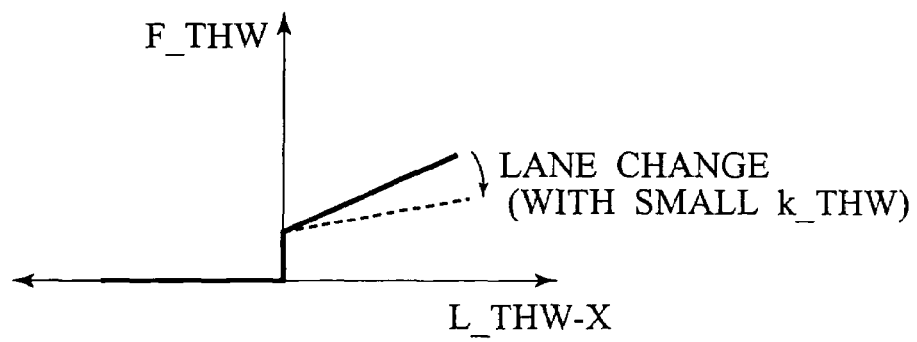
FIG. 32 is a characteristic diagram showing a first counter force F_THW that varies in response to the length (L_THW–X) of a vitual spring.
Figure 33:
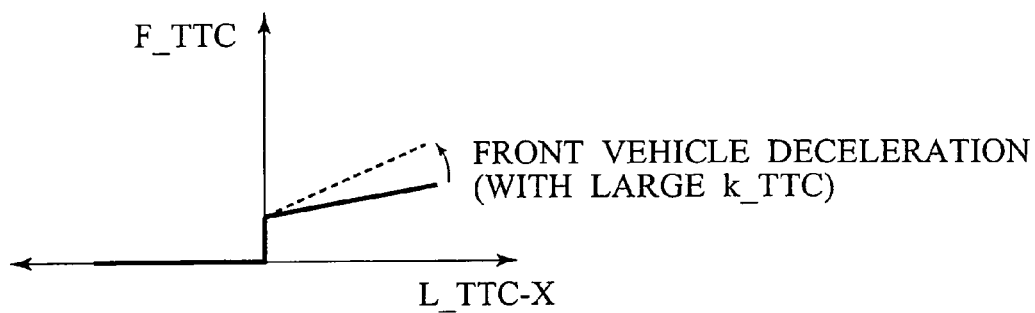
FIG. 33 is a characteristic diagram showing a second counter force F_TTC that varies in response to the length (L_TTC–X) of a virtual spring.

By setting the parameters in this way, an increment in the first counter force F_THW becomes smaller than a normal increment (continuous line in FIG. 32) as indicated with a dotted line in FIG. 32. On the other hand, an increment in the second counter force F_TTC becomes greater than a normal one (continuous line in FIG. 33) as indicated with a dotted line in FIG. 33. As a result, only with the braking force controller 20, i.e., only with the brake, the fifth embodiment can provide a contact possibility warning similarly to the first embodiment. Namely, the fifth embodiment can provide a contact possibility warning by generating any one of the counter force based on the absolute collision time only through the braking force controller 20. If the own vehicle changes its lane and if an elapsed time after the lane change is within a predetermined time, the fifth embodiment delays the timing of generation of the counter force based on the absolute collision time, decreases an increment of the counter force according to the absolute collision time, and increases an increment of the counter force based on the relative collision time. As a result, the own vehicle can smoothly change its lane to follow another vehicle. If the other vehicle (front vehicle) suddenly decelerates, a contact possibility warning can surely be made.

Various embodiments of the present invention have been explained. The present invention, however, is not limited to these embodiments. As an example of the driver intentionally reducing an object-to-object distance under a steady state, a lane change has been explained. This does not limit the present invention. For example, if the own vehicle is driving in a straight line and it is detected that the driver intentionally reduces an object-to-object distance under a steady state, the timing of the generation of a contact possibility warning may be delayed. In this case, detecting the driver of intentionally reducing an object-to-object distance under a steady state can be made according to, for example, the behavior of the driver, the behavior of the vehicle, or a road classification.

The embodiments mentioned above calculate the correction value Fc by assuming a virtal spring as an elastic body in front of the own vehicle. This does not limit the present invention. The parameters that are functions of an object-to-object distance may be calculated with the use of other techniques. The processes of steps S1, S2, and S4 to S7 of FIG. 8 carried out by the primary controller 5, the radar 30, and the object detecting processor 2 realize a contact possibility detector to detect a possibility of the own vehicle contacting an object that is present in front of the own vehicle. The processes of steps S9 and S10 of FIG. 8 carried out by the primary controller 5 realize a contact possibility warning unit to provide a contact possibility warning by changing at least one of driving torque and braking torque according to the contact possibility detected by the contact possibility detector. The process of step S3 of FIG. 8 carried out by the primary controller 5 realizes a driver intention detector to detect whether the driver intentionally reduces an object-to-object distance under a steady state. The processes of steps S21 and S23 of FIG. 12 carried out by the primary controller 5 realize a warning controller to delay the timing of a warning provided by the contact possibility warning unit based on an object-to-object distance if the driver intention detector detects that the driver intentionally reduces the object-to-object distance under a steady state. The determination of a contact possibility made according to a result of comparison between an absolute collision time THW and an absolute collision time threshold THW_Th corresponds to the determination of a possibility of the own vehicle contacting with an object that is present in front of the own vehicle made according to a distance between the own vehicle and the front object.

The processes of step S51 of FIG. 21 and step S52 of FIG. 22 carried out by the primary controller 5 realize a deceleration possibility detector to detect a possibility of the deceleration of an object that is present in front of the own vehicle.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An information providing apparatus for a vehicle, comprising:
   a contact possibility information unit configured to determine a contact possibility of the vehicle contacting with an object that is present in front of the vehicle according to relative motion between the vehicle and the front object, the contact possibility information unit providing contact possibility information by changing at least one of the driving force and the braking force of the vehicle according to the contact possibility;
   a driver intention detector configured to detect a driving intention of a driver of the vehicle, the driver intention detector detecting at least a driving intention of the driver that the driver is driving the vehicle in recognition that the possibility of the vehicle contacting the front object is increasing; and
   a controller configured to modify at least one threshold for providing the contact possibility information according to a detection result provided by the driver intention detector;
   wherein the controller is configured to modify the at least one threshold to delay the timing of providing the contact possibility information;
   wherein the contact possibility information unit determines a contact possibility by comparing a first time derived by dividing a relative distance between the vehicle and the front object by a speed of the vehicle with a first time threshold and provides contact possibility information under a first control condition according to the determined contact possibility;
   wherein the controller modifies the threshold to delay the timing of providing the contact possibility information by changing the first time threshold.

2. The information providing apparatus of claim 1, wherein:
   the driving intention is that the driver intentionally brings the vehicle closer to the front object when the vehicle is driven in a steady state.

3. The information providing apparatus of claim 2, wherein:
   the driver intention detector detects a lane change of the vehicle as the intention of the driver in intentionally bringing the vehicle closer to the front object.

4. The information providing apparatus of claim 2, wherein:
   the controller delays the timing of providing the contact possibility information in a case where the front object is in a lane to which the vehicle is going to change its lane.

5. The information providing apparatus of claim 1, wherein:
   in a case where the driver intention detector detects that the driver is intentionally bringing the vehicle closer to the front object with the vehicle in a steady driving state, the controller reduces a control value to change the driving force or braking force.

6. The information providing apparatus of claim 2, wherein:
   in a case where the driver intention detector detects that the driver is intentionally bringing the vehicle closer to the front object with the vehicle in a steady driving state, the controller reduces a control value to change the driving force or braking force.

7. The information providing apparatus of claim 1, wherein:
   the relative motion includes a relative speed between the vehicle and the front object; and
   in a case where the driver intention detector detects that the driver is intentionally bringing the vehicle closer to the front object with the vehicle being in a steady driving state, the controller changes a control value of at least one of the driving force and braking force according to the relative speed.

8. The information providing apparatus of claim 1, wherein the controller releases the modification after a predetermined time.

9. The information providing apparatus of claim 2, wherein the controller releases the modification after a predetermined time.

10. The information providing apparatus of claim 3, wherein the controller releases the modification after a predetermined time.

11. The information providing apparatus of claim 4, wherein the controller releases the modification after a predetermined time.

12. The information providing apparatus of claim 5, wherein the controller releases the modification after a predetermined time.

13. The information providing apparatus of claim 6, wherein the controller releases the modification after a predetermined time.

14. The information providing apparatus of claim 7, wherein the controller releases the modification after a predetermined time.

15. The information providing apparatus of claim 1, wherein:
the driving intention is determined as being that the driver intentionally brings the vehicle closer to the front object with the vehicle being driven under a steady state; and
the controller reduces a control value to change the driving force or braking force by changing the first control condition.

16. The information providing apparatus of claim 1, wherein:
the contact possibility information unit determines a contact possibility by comparing a second time derived by dividing a relative distance between the vehicle and the front object by a relative speed between the vehicle and the front object with a second time threshold and provides contact possibility information under a second control condition according to the determined contact possibility.

17. An information providing apparatus for a vehicle, comprising:
contact possibility information means for determining a contact possibility of the vehicle contacting with an object that is present in front of the vehicle according to relative motion between the vehicle and the front object, the contact possibility information means providing contact possibility information by changing at least one of the driving force and braking force of the vehicle according to the contact possibility;
driver intention detecting means for detecting a driving intention of a driver of the vehicle, the driver intention detecting means detecting at least a driving intention of the driver that the driver is driving the vehicle in recognition that the possibility of the vehicle contacting the front object is increasing; and
controlling means for modifying at least one threshold for providing the contact possibility information according to a detection result provided by the driver intention detecting means;
wherein the controlling means is configured to modify the at least one threshold to delay the timing of providing the contact possibility information;
wherein the contact possibility information means determines a contact possibility by comparing a first time derived by dividing a relative distance between the vehicle and the front object by a speed of the vehicle with a first time threshold and provides contact possibility information under a first control condition according to the determined contact possibility;
wherein the controlling means modifies the threshold to delay the timing of providing the contact possibility information by changing the first time threshold.

18. An information providing method for a vehicle, comprising:
determining a contact possibility of the vehicle contacting with an object that is present in front of the vehicle according to relative motion between the vehicle and the front object;
detecting a driving intention of a driver of the vehicle, to detect at least a driving intention of the driver that the driver is driving the vehicle in recognition that the possibility of the vehicle contacting the front object is increasing;
calculating, according to the contact possibility, a control value to change at least one of the driving force and braking force of the vehicle; and
modifying a threshold for providing the control value according to a result of the detecting a driving intention so that timing of providing the control value is delayed;
wherein the step of determining a contact possibility comprises determining a contact possibility by comparing a first time derived by dividing a relative distance between the vehicle and the front object by a speed of the vehicle with a first time threshold and providing contact possibility information under a first control condition according to the determined contact possibility;
wherein the threshold for providing the control value is modified by changing the first time threshold.

19. An information providing apparatus for a vehicle, comprising:
a contact possibility information unit configured to determine a contact possibility of the vehicle contacting with an object that is present in front of the vehicle according to relative motion between the vehicle and the front object, the contact possibility information unit providing contact possibility information by changing at least one of the driving force and the braking force of the vehicle according to the contact possibility;
a driver intention detector configured to detect a driving intention of a driver of the vehicle, the driver intention detector detecting at least a driving intention of the driver that the driver is driving the vehicle in recognition that the possibility of the vehicle contacting the front object is increasing; and
a controller configured to modify at least one threshold for providing the contact possibility information according to a detection result provided by the driver intention detector;
wherein the controller is configured to track a predetermined amount of time when the driver intention detector detects a driving intention of the driver that the driver is driving the vehicle in recognition that the possibility of the vehicle contacting the front object is increasing;
wherein the controller is configured to determine if the predetermined amount of time has elapsed, wherein if the predetermined amount of time has elapsed the threshold is no longer modified, and wherein if the predetermined amount of time has not elapsed the threshold remains modified;
wherein the driver intention detector detects a lane change of the vehicle as an intention of the driver in intentionally bringing the vehicle closer to the front object;
wherein the controller is further configured to determine if the object is also changing lanes after the controller determines that the predetermined amount of time has not elapsed, wherein if the object is changing lanes the threshold is not modified, and wherein if the object is not changing lanes the threshold is modified.

20. The information providing apparatus of claim 19, wherein:
the controller is further configured to compare a deceleration of the object to a predetermined deceleration value after the controller determines that the predetermined amount of time has not elapsed;

wherein if the deceleration is smaller than the predetermined deceleration value a control value for at least one of the driving force and the braking force, determined according to a relative speed between the vehicle and the front object, is modified to a first value; and wherein if the deceleration is greater than the predetermined deceleration value the control value for at least one of the driving force and the braking force, determined according to a relative speed between the vehicle and the front object, is modified to a second value.

21. An information providing apparatus for a vehicle, comprising:

a contact possibility information unit configured to determine a contact possibility of the vehicle contacting with an object that is present in front of the vehicle according to relative motion between the vehicle and the front object, the contact possibility information unit providing contact possibility information by changing at least one of the driving force and the braking force of the vehicle according to the contact possibility;

a driver intention detector configured to detect a driving intention of a driver of the vehicle, the driver intention detector detecting at least a driving intention of the driver that the driver is driving the vehicle in recognition that the possibility of the vehicle contacting the front object is increasing; and a controller configured to modify at least one threshold for providing the contact possibility information according to a detection result provided by the driver intention detector;

wherein the contact possibility information unit determines a contact possibility by comparing a first time derived by dividing a relative distance between the vehicle and the front object by a speed of the vehicle with a first time threshold and provides contact possibility information under a first control condition according to the determined contact possibility;

wherein the controller modifies the threshold to delay the timing of providing the contact possibility information by changing the first time threshold;

wherein the contact possibility information unit determines a contact possibility by comparing a second time derived by dividing a relative distance between the vehicle and the front object by a relative speed between the vehicle and the front object with a second time threshold and provides contact possibility information under a second control condition according to the determined contact possibility;

wherein the controller is configured to determine the first control condition on the basis of a first virtual spring with a first spring length and a first elastic coefficient;

wherein the controller is configured to determine the first spring length on the basis of the first time threshold and the speed of the vehicle;

wherein the controller is configured to determine the second control condition on the basis of a second virtual spring with a second spring length and a second elastic coefficient;

wherein the controller is configured to determine the second spring length on the basis of the second time threshold and the relative speed; and wherein the controller modifies at least one threshold by changing at least one of the values of the first time threshold, the first elastic coefficient, and the second elastic coefficient.

22. An information providing apparatus for a vehicle, comprising:

a contact possibility information unit configured to determine a contact possibility of the vehicle contacting with an object that is present in front of the vehicle according to relative motion between the vehicle and the front object, the contact possibility information unit providing contact possibility information by changing at least one of the driving force and the braking force of the vehicle according to the contact possibility;

a driver intention detector configured to detect a driving intention of a driver of the vehicle, the driver intention detector detecting at least a driving intention of the driver that the driver is driving the vehicle in recognition that the possibility of the vehicle contacting the front object is increasing; and a controller configured to modify at least one threshold for providing the contact possibility information according to a detection result provided by the driver intention detector;

wherein the controller is configured to modify the at least one threshold to delay the timing of providing the contact possibility information;

wherein the apparatus employs a first virtual spring.

23. The information providing apparatus of claim 22, wherein the apparatus further employs a second virtual spring.

24. A controller for a host vehicle which has an object detecting unit that detects an object ahead of the host vehicle, the controller comprising:

a processor that is adapted to calculate a counterforce of a virtual member in front of the host vehicle which provides feedback to a driver of the host vehicle based on a relationship between the host vehicle and an object ahead of the host vehicle;

wherein the processor is configured to delay the timing of providing the feedback to the driver when an intention of the driver is detected.

25. The controller of claim 24, wherein the processor is configured to delay the timing of providing the feedback to the driver by reducing a length of the virtual member.

26. The controller of claim 24, wherein the processor is configured to delay timing of providing feedback to the driver when an intention of the driver is detected that the driver is driving the vehicle in recognition that the possibility of the vehicle contacting the object is increasing.

27. The controller of claim 24, wherein the processor delays the timing of providing contact possibility information in a case where the object is in a lane to which the vehicle is going to change its lane.

28. The controller of claim 24, wherein the processor determines a contact possibility by comparing a first time derived by dividing a relative distance between the vehicle and the object by a speed of the vehicle with a first time threshold, wherein the controller provides the feedback to the driver under a first control condition according to the determined contact possibility; and wherein the controller delays the timing of providing the feedback to the driver by changing the first time threshold.

29. The controller of claim 28, wherein the processor determines a contact possibility by comparing a second time derived by dividing a relative distance between the vehicle and the object by a relative speed between the vehicle and the object with a second time threshold and provides the feedback to the driver under a second control condition according to the determined contact possibility.

30. A controller for an own vehicle which has an object detecting unit that detects an object ahead of the own vehicle, comprising:
- a processor that is adapted to calculate a counterforce of a virtual member in front of the own vehicle which provides feedback to a driver of the own vehicle based on a relationship between the own vehicle, an object ahead of the own vehicle and an intention of the driver.

31. The controller of claim 30, wherein the processor detects a lane change of the vehicle as the intention of the driver.

32. The controller of claim 24, wherein the processor detects a lane change of the vehicle as the intention of the driver.

* * * * *